(12) United States Patent
Matsumoto

(10) Patent No.: US 8,042,579 B2
(45) Date of Patent: Oct. 25, 2011

(54) PAINT REPLENISHING SYSTEM FOR CARTRIDGE

(75) Inventor: Tomohiro Matsumoto, Fujieda (JP)

(73) Assignee: ABB K.K., Tokyo (JP)

( * ) Notice: Subject to any disclaimer, the term of this patent is extended or adjusted under 35 U.S.C. 154(b) by 428 days.

(21) Appl. No.: 12/377,391

(22) PCT Filed: Sep. 7, 2007

(86) PCT No.: PCT/JP2007/067897
§ 371 (c)(1),
(2), (4) Date: Feb. 13, 2009

(87) PCT Pub. No.: WO2008/065794
PCT Pub. Date: Jun. 5, 2008

(65) Prior Publication Data
US 2010/0243101 A1 Sep. 30, 2010

(30) Foreign Application Priority Data
Nov. 30, 2006 (JP) ................. 2006-323921

(51) Int. Cl.
*B05B 5/16* (2006.01)
(52) U.S. Cl. ............. 141/94; 141/27; 141/20.5; 141/67; 141/104; 141/302; 222/389; 901/43
(58) Field of Classification Search ............... 141/18, 141/21–23, 20.5, 25–27, 67, 89, 90, 94, 98, 141/104, 193, 301–302, 309, 285; 222/144.5, 222/309, 341, 372, 389; 901/43; 239/319, 239/328–331
See application file for complete search history.

(56) References Cited

U.S. PATENT DOCUMENTS

| 6,164,561 A * | 12/2000 | Yoshida et al. ............... 239/223 |
| 6,742,722 B2 | 6/2004 | Hosoda et al. |
| 2009/0277530 A1* | 11/2009 | Nomura et al. .................... 141/2 |

FOREIGN PATENT DOCUMENTS

| JP | 9 41 | 1/1997 |
| JP | 2000 176328 | 6/2000 |
| JP | 2002 11396 | 1/2002 |
| JP | 2004 42036 | 2/2004 |
| JP | 2006 341198 | 12/2006 |

* cited by examiner

*Primary Examiner* — Timothy L Maust
*Assistant Examiner* — Timothy Kelly
(74) *Attorney, Agent, or Firm* — Oblon, Spivak, McClelland, Maier & Neustadt, L.L.P.

(57) ABSTRACT

A quantitation setup mechanism (58) is composed of a piston (62) which is incorporated into a quantitation tank (61) to define therein a metering chamber (63), a quantitation setup portion (65) for presetting a quantity of paint replenishment, and a sensor (66) adapted to detect a displacement of the piston (62) preset by the quantitation setup portion (65). In this instance, paint is replenished into a paint chamber (19) of a cartridge (16) by means of a paint feed mechanism (32). In the course of the paint replenishment, an equivalent amount of an extruding liquid is displaced and discharged from an extruding liquid chamber (20). The displaced extruding liquid is introduced into the metering chamber (63) of the quantitation setup mechanism (58), detecting a quantity of displacement of the extruding liquid by replenished paint by the sensor (66) through the piston (62) to exactly quantitate the paint replenishment.

9 Claims, 17 Drawing Sheets

PAINT REPLENISHING SYSTEM FOR CARTRIDGE

TECHNICAL FIELD

This invention relates to a paint replenishing system for a cartridge particularly suitable for use, for example, in refilling paint into cartridges which are designed to be interchangeably used on a paint coating machine.

BACKGROUND ART

Generally, a paint coating system for use in coating work pieces like vehicle bodies is required to be able to reduce the amount of waste paint which has to be discarded at the time of a color change, and to be able to cope with a large number of paint colors. As a paint coating system which can meets these requirements, there has been known in the art a cartridge type paint coating system employing cartridges which are filled with different colors and adapted to be interchangeably attached to a coater unit (see, for example, Patent Literature 1: Japanese Patent Laid-Open No. 2000-176328, Patent Literature 2: Japanese Patent Laid-Open No. 2004-42036).

The cartridge type paint coating system, according to the prior art mentioned-above, is largely constituted by a paint coating machine including a coater unit for spraying paint which is supplied from loaded cartridge toward a coating object, and a paint replenishing system for a cartridge which is adapted to replenish an empty or consumed cartridge with paint which is supplied from a paint source by way of a paint supply line.

In this case, the paint replenishing system for a cartridge is provided with a paint feed means adapted to supply paint to a paint chamber which cartridge is defined in a paint chamber and an extruding liquid chamber by a movable partition wall, and an extruding liquid supply means adapted to push out residues of a previous color from the paint chamber by supplying an extruding liquid to the extruding liquid chamber of the cartridge.

As soon as a cartridge is set on a replenishing stool, an extruding liquid is supplied to an extruding liquid chamber in the cartridge from an extruding feed means to push out residues of a previous color from a paint chamber. In the next place, paint is replenished into the paint chamber of the cartridge by a paint feed means. At this time, the extruding liquid in the extruding liquid chamber is discharged and collected in an extruding liquid storage tank.

Generally, a paint replenishing system for a cartridge of this sort is provided with a flow meter in a paint conduit for the purpose of resilling a cartridge with a predetermined amount of paint which will be used in next coating operation. By means of this flow meter, the paint replenishing system for a cartridge can measure the flow rate of paint in supply to a cartridge, turning off the paint supply as soon as the cartridge is replenished with a suitable amount of paint which is determined depending upon the size of a work piece to be painted, coating film thickness and other conditions of a paint coating operation.

In this regard, according to the prior art mentioned above, a flow meter is provided in the course of a paint supply conduit thereby to measure the amount of replenishing paint. Taking into consideration the fact that there are a diversity of paint products which differ from each other in properties such as viscosity and specific gravity and which may or may not contain mica or a metallic component. Therefore, depending upon paint properties, errors can occur to measurements by a flow meter. Therefore, in the prior art, this problem is coped with by replenishing cartridges with paint in an amount which is larger than an actually necessary amount, precluding the possibilities of a shutdown of a coating operation due to paint shortage.

However, in case a cartridges is refilled with more than a necessary amount of paint, a larger amount of paint which still remains in the cartridge has to be discarded at the end of each coating operation, resulting in larger paint consumption and increases in running cost due to degradations in operational efficiency caused by necessities for heavier paint washing and disposing operations involving a larger amount of waste paint.

In this regard, it is conceivable to cut the amount of waste paint by returning a residual paint in a cartridge to a paint source. However, even so, it is technically difficult to return to a paint source all of residual paint in a cartridge including paint residues in a long paint conduit connected to the paint source. Paint residues in a paint conduit have to be discharged as a waste liquid at the time of a color changing operation.

On the other hand, in a case where each one of cartridges is used exclusively for a particular color, there is no necessity for washing a cartridge at the time of a color change. However, after repeated refilling operations, excess paint can remain in a cartridge as an old content which is degraded in quality to such a degree as to give adverse effects on finish quality and therefore may degrade the quality of coatings when mixed into fresh paint.

DISCLOSURE OF THE INVENTION

In view of the above-discussed problems with the prior art, it is an object of the present invention to provide a paint replenishing system for a cartridge which is capable of exactly quantitating paint to be replenished into a cartridge on the basis of a quantity of paint to be used in a paint coating operation, to reduce the paint consumption by cutting the amount of waste paint to be discarded as well as the cost of waste disposal and improve the painting quality.

It is another object of the present invention to provide a paint replenishing system for a cartridge which is arranged to quantitate a paint replenishment by way of a quantity of an extruding liquid which is displaced and discharged from a cartridge in step with a progress of the paint replenishment.

(1) According to the present invention, there is provided a paint replenishing system for a cartridge composed of: a paint feed means for feeding paint to a cartridge which is defined to a paint chamber and an extruding liquid chamber by a partition wall, and an extruding liquid feed means adapted to push out residual paint from the paint chamber by feeding an extruding liquid to the extruding liquid chamber of the cartridge.

In order to achieve the above-stated objective, the paint replenishing system for a cartridge according to the present invention comprises: a quantitation setup means for presetting a quantity of paint to be replenished into the paint chamber of the cartridge according to a preset target quantitation value, and stopping paint replenishment by the paint feed means as soon as discharges of an extruding liquid from the extruding liquid chamber reach a preset target quantitation value by a replenished paint of the paint chamber by the paint feed means.

With the arrangements just described, a cartridge is set on the paint feed means, connecting the extruding liquid feed means to the extruding liquid chamber of the cartridge. In this state, an extruding liquid is fed to the extruding liquid chamber of the cartridge from the extruding liquid feed means to push out residual paint from the paint chamber of the cartridge, getting rid of residues of a color which was not used in a previous paint coating operation. Then, the paint feed means is connected to the paint chamber of the cartridge, and wash fluids are fed thereto to wash clean the interiors of the paint chamber.

On the other hand, by way of the quantitation setup means, a quantity of a next color to be replenished into the paint chamber of the cartridge is set at a specified target value. In this state, paint of a color to be used in a next paint coating operation is fed to the cartridge from the paint feed means. At this time, by the paint replenishment to the paint chamber, an equivalent amount of an extruding liquid is displaced and discharged from the extruding liquid chamber of the cartridge.

In the meantime, the discharged amount of the extruding liquid are measured by the quantitation setup means. As soon as the discharged amount of the extruding liquid reach a quantity corresponding to a preset target quantitation value, the paint supply from the paint feed means is stopped to complete a quantitative paint replenishment to the cartridge by the quantitation setup means.

Thus, irrespective of paint properties (e.g., viscosity, specific gravity or existence or absence of a metallic component and the like), paint can be replenished into a paint chamber of a cartridge exactly in a quantity which is required in a next coating operation.

That is to say, irrespective of the nature or properties, all kinds of paint media can be replenished into a cartridge correctly in a specified quantity to realize a significant reduction in paint consumption by cutting the amount of discarding waste paint, in addition to a cut in cost of waste paint disposal. Even in a case where a cartridge is repeatedly replenished exclusively with paint of a particular color, the cartridge can be exempted from degradations in coating quality, it becomes possible to improve painting quality.

(2) According to the present invention, wherein the quantitation setup means is comprised of a quantitation tank, an extruding liquid line change-over valve for selectively connecting the extruding liquid chamber of the cartridge with either an extruding liquid feed means or the quantitation tank, a movable partition wall incorporated into the quantitation tank to define therein a metering chamber having an inner volume varying in proportion to a quantity of the extruding liquid introduced into the metering chamber from the extruding liquid chamber of the cartridge, a quantitation setup portion for presetting a quantity of paint replenishment to the extruding liquid chamber of the cartridge, and a sensor adapted to output a detection signal as soon as the movable partition wall is displaced to a predetermined position preset by the quantitation setup portion.

Thus, through the quantitation setup portion of the quantitation setup means, the position of the sensor is adjusted in such a way that it can detect the movable partition wall when the latter is displaced to a preset quantitation position. Further, the extruding liquid chamber of the cartridge is connected to the quantitation tank by way of the extruding liquid passage change-over valve of the quantitation setup means. As a consequence, an extruding liquid, which is displaced and discharged from the extruding liquid chamber of the cartridge, is introduced into the metering chamber of the quantitation tank by way of the extruding liquid passage change-over valve. The sensor outputs a detection signal as soon as the movable partition wall is displaced to a preset quantitation position. Thus, the quantitation setup means is arranged to correctly quantitate a paint replenishment to a paint chamber of a cartridge by metering the amount of extruding liquid which is stable in nature.

(3) In the case of the paint replenishing system for a cartridge in (2) above, wherein the paint feed means is adapted to stop a quantitative paint replenishment in response to a signal output by the sensor.

The paint replenishment by the paint feed means is stopped as soon as a detection signal is output by the sensor upon detection of a displacement of the movable partition wall to a preset quantitation position. Thus, exactly a predetermined amount of paint can be replenished into the paint chamber of the cartridge.

(4) Further, in the case of the paint replenishing system for a cartridge in (2) above, wherein the quantitation setup portion is adapted to squeeze residues of the extruding liquid out of the metering chamber by pushing the movable partition wall as far as an initial position, reducing inner space of the metering chamber to a minimum volume.

Thus, upon completing a measurement of paint replenishment to the cartridge by way of introducing the extruding liquid into the metering chamber and a displacement of the movable partition wall, the quantitation setup portion can push back the movable partition wall. At this time, residues of the extruding liquid can be squeezed out of the metering chamber since the inner space of the metering chamber is reduced to a minimum volume as the movable partition wall is pushed toward an initial position by the quantitation setup portion. It follows that there is no necessity for providing a mechanism exclusively for resetting the movable partition wall. Namely, the quantitation setup portion which is provided for shifting a sensor position is utilized for resetting the movable partition wall, to simplify the construction.

(5) Further, in the case of the paint replenishing system for a cartridge in (2) above, wherein a metering chamber and an air chamber are defined in the quantitation tank by the movable partition wall, the air chamber of the quantitation tank being connected to an air valve thereby to push the partition wall as far as an initial position, reducing inner space of the metering chamber to a minimum volume.

In this case, after measurement of the displaced extruding liquid, the air valve is opened to introduce compressed air into the air chamber of the quantitation tank, thereby pushing the movable partition wall toward and as far as an initial position. Thus, the extruding liquid can be discharged from the metering chamber without moving the quantitation setup portion.

(6) Further, in the case of the paint replenishing system for a cartridge in (2) above, wherein an initial position sensor is provided in the quantitation tank to detect location of said movable partition wall at an initial position after pushing inner space of the metering chamber to a minimum volume.

In this case, whether or not the movable partition wall is reset in an initial position can be checked by the initial position sensor, to guarantee a correct measurement of the extruding liquid.

(7) On the other hand, a paint replenishing system for a cartridge according to the present invention, wherein the paint feed means is comprised of a replenishing stool for mounting a cartridge, a color change valve device connected to the replenishing stool to supply paint and wash fluids to the cartridge, and a paint feed valve connected between the replenishing stool and the color change valve device to turn on and off a paint supply from the color change valve device; the quantitation setup means being adapted to output a replenishment stop signal as soon as discharges of an extruding liquid from the extruding liquid chamber of the cartridge reach a preset quantitation value; and the paint feed means being adapted to end a quantitative paint replenishment by stopping a paint supply from the paint feed valve and/or the color change valve device to complete a quantitative replenishment as soon as a replenishment stop signal is output by the quantitation setup means.

In this case, as soon as a cartridge is set on a replenishing stool, the color change valve device is brought into a connected state for feeding paint to a paint chamber of the cartridge via the paint feed valve. At this time, an extruding liquid is displaced and discharged from the extruding liquid chamber of the cartridge to the quantitation setup means. Thus, the quantitation setup means is adapted to quantitate paint replenishment by measuring a quantity of the displaced extruding liquid. The paint feed valve and/or the color change valve device is closed as soon as a replenishment stop signal is output by the quantitation setup means, exactly quantitating the paint replenishment to the paint chamber of the cartridge according to a preset quantitation value.

(8) Further, a paint replenishing system for a cartridge according to the present invention, wherein the paint feed means is comprised of a replenishing stool for mounting the cartridge, a color change valve device connected to the replenishing stool to supply paint and wash fluids to the cartridge, and a paint feed valve connected between the replenishing stool and the color change valve device to turn on and off a paint supply from the color change valve device; the extruding liquid feed means being comprised of an extruding liquid source holding a stock of extruding liquid, an extruding liquid line connected between the extruding liquid source and the replenishing stool, and a pump provided in the extruding liquid line; the quantitation setup means being comprised of an extruding liquid line change-over valve provided in the extruding liquid line at a position between the replenishing stool and the pump, a quantitation tank connected to the extruding liquid line change-over valve, a movable partition wall incorporated into the quantitation tank to define therein a metering chamber having an inner volume varying in proportion to a quantity of an extruding liquid introduced into the metering chamber from the extruding liquid chamber of the cartridge, a quantitation setup portion for presetting a quantity of paint replenishment to the extruding liquid chamber of the cartridge, and a sensor adapted to output a replenishment stop signal as soon as the movable partition wall is displaced to a predetermined position preset by the quantitation setup portion; and the extruding liquid line change-over valve being comprised of a feed valve for establishing and blocking communication between the extruding liquid chamber of the cartridge and the pump, and a return valve for establishing and blocking communication between the extruding liquid chamber of the cartridge and the metering chamber of the quantitation tank.

In this case, prior to a quantitation, the feed valve of the extruding liquid passage change-over valve is opened to communicate the extruding liquid chamber of a cartridge with the pump, while the return valve is closed to block communication between the extruding liquid chamber of the cartridge and the metering chamber of the quantitation tank. In this state, an extruding liquid is supplied to the extruding liquid chamber of the cartridge from the extruding liquid source by the pump.

On the other hand, at the time of a quantitation, the feed valve of the extruding liquid passage change-over valve is closed to block communication between the extruding liquid chamber of a cartridge and pump, while the return valve is opened to communicate the extruding liquid chamber of the cartridge with the metering chamber of the quantitation tank, feeding the metering chamber of the quantitation tank with an extruding liquid which is displaced and discharged from the extruding liquid chamber of the cartridge.

At this time, a replenishment stop signal is output by the sensor of the quantitation setup means upon detection of a displacement of the movable partition wall to a position of a specific quantitation value by the quantitation setup portion. Thus, the quantitation setup means can accurately quantitate the paint replenishment to a paint chamber of a cartridge.

(9) Further, in the case of the paint replenishing system in (8) above, wherein the paint feed means is adapted to end a quantitative paint replenishment by stopping a paint supply from the paint feed valve and/or the color change valve device in response to a replenishment stop signal output by the sensor of the quantitation setup means.

In this case, a paint supply from the paint feed valve is stopped as soon as a replenishment stop signal is output from the sensor of the quantitation setup means, to replenish the cartridge with a specified amount of paint.

(10) Further, in the case of the paint replenishing system for a cartridge in (8) above, wherein the quantitation setup means further comprises a drain valve which being closed when an extruding liquid is introduced into the metering chamber of the quantitation tank and opened when draining the extruding liquid from the metering chamber.

In this case, the drain valve is kept in a closed state when an extruding liquid is introduced into the metering chamber of the quantitation tank by the quantitation setup means. The extruding liquid is drained from the metering chamber upon opening the drain valve.

BRIEF DESCRIPTION OF THE DRAWINGS

In the accompanying drawings:

FIG. 13 is a time chart for a paint replenishing operation by the paint replenishing system for a cartridge in the case of refilling a cartridge with paint of a different color;

Figure 14:
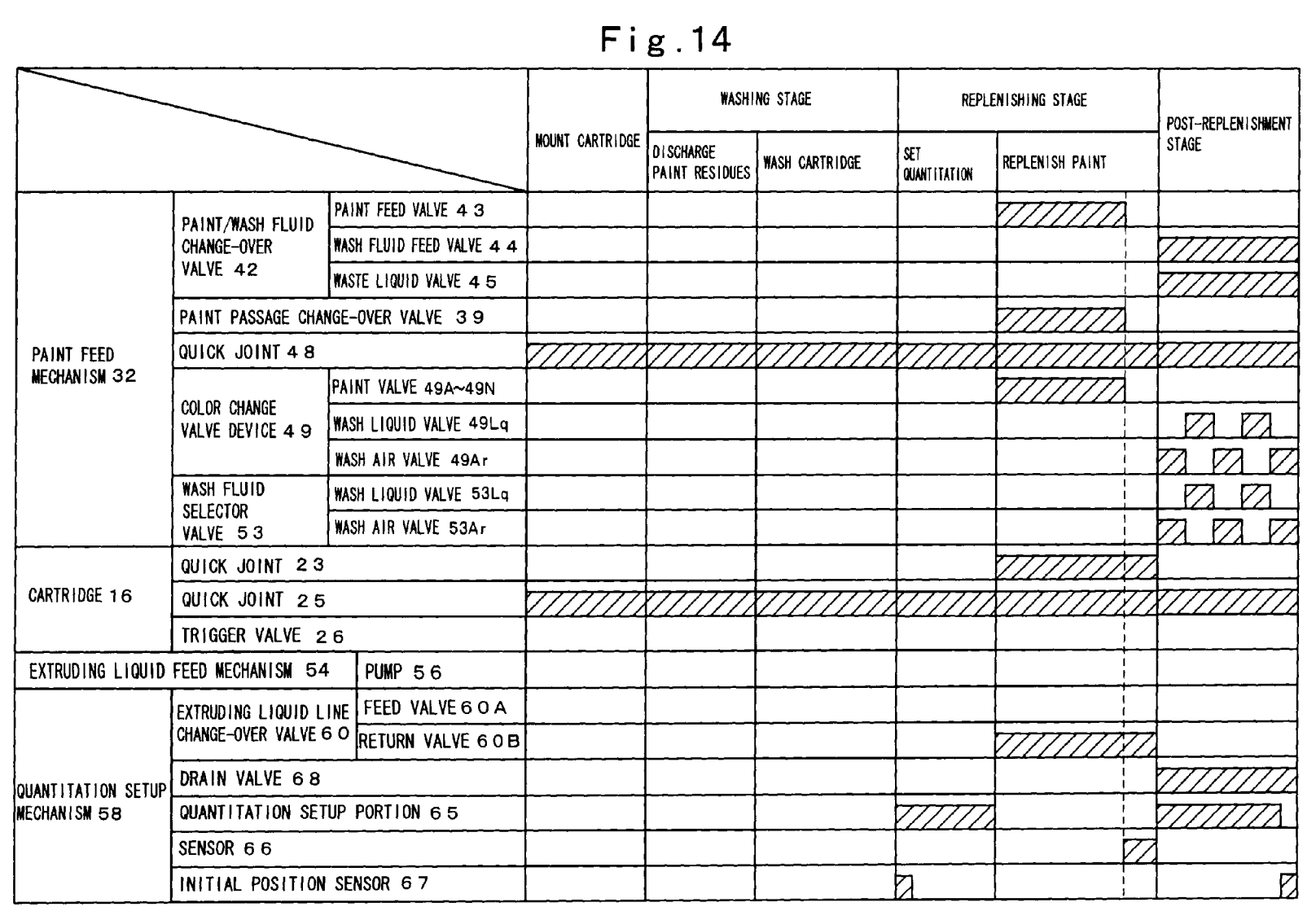

FIG. 14 is a time chart for a paint replenishing operation by the paint replenishing system for a cartridge in the case of refilling a paint color repeatedly with paint of the same color;

FIG. 16 is a time chart of a paint replenishing operation in the case of refilling a cartridge with paint by the use of the quantitation setup means of the second embodiment.

BEST MODE FOR CARRYING OUT THE INVENTION

Hereafter, with reference to the accompanying drawings, the paint replenishing system for a cartridge of the present invention is described more particularly by way of its preferred embodiments which are applied to cartridges to be interchangeably mounted on a rotary atomizing head type coater unit when replenishing paint.

Figure 1:
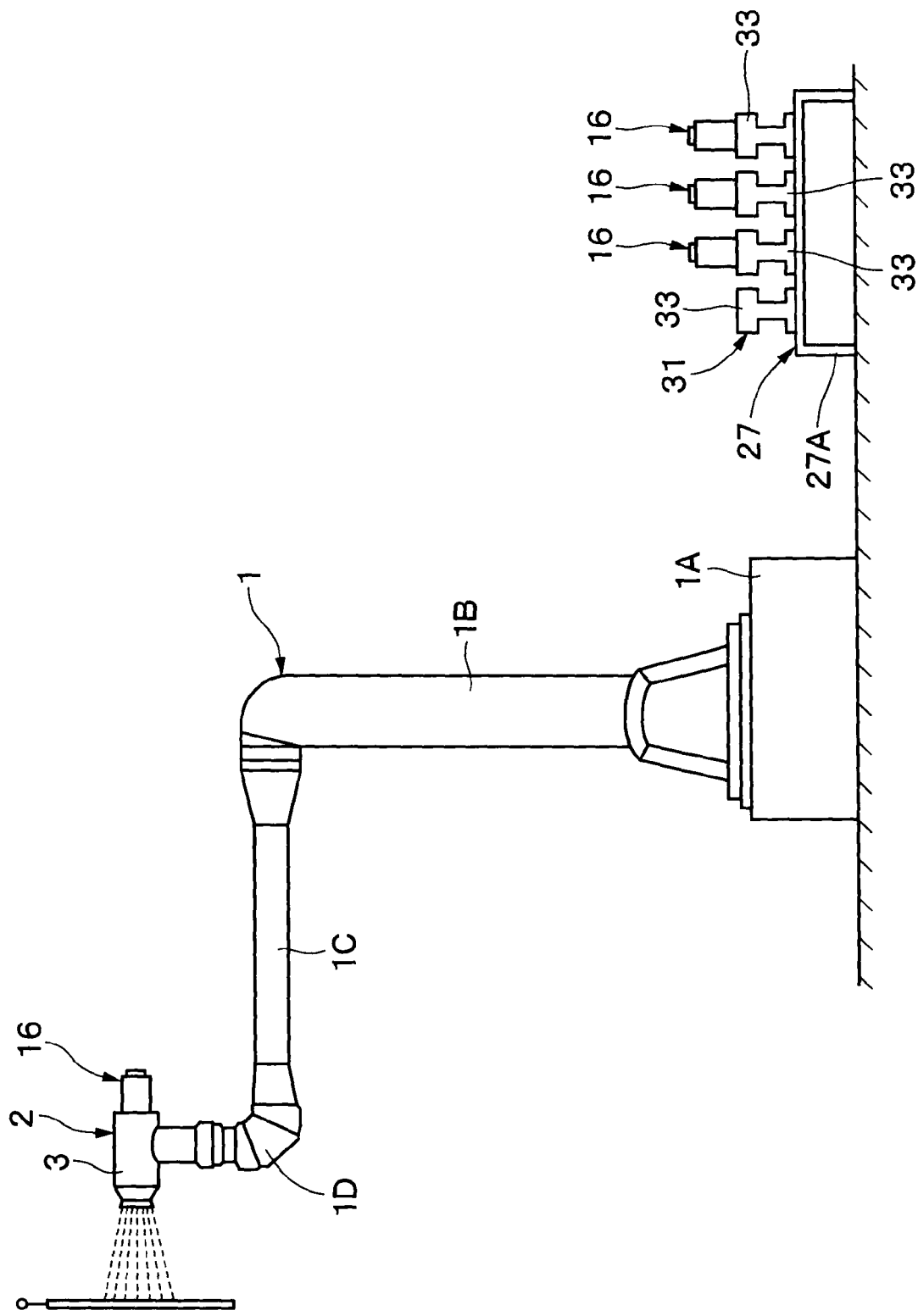
FIG. 1 is a schematic illustration showing general layout of a paint replenishing system for a cartridge according to a first embodiment of the invention.

Referring to FIGS. 1 through 14, there is shown a first embodiment of the present invention. In FIG. 1, indicated at 1 is a coating robot which constitutes part of a paint coating system. This coating robot 1 is built of a pedestal 1A, a vertical arm 1B which is rotatably and pivotally mounted on the pedestal 1A, a horizontal arm 1C which is pivotally connected to a top end of the vertical arm 1B, and a wrist 1D which is provided at a distal end of the horizontal arm 1C.

Figure 2:
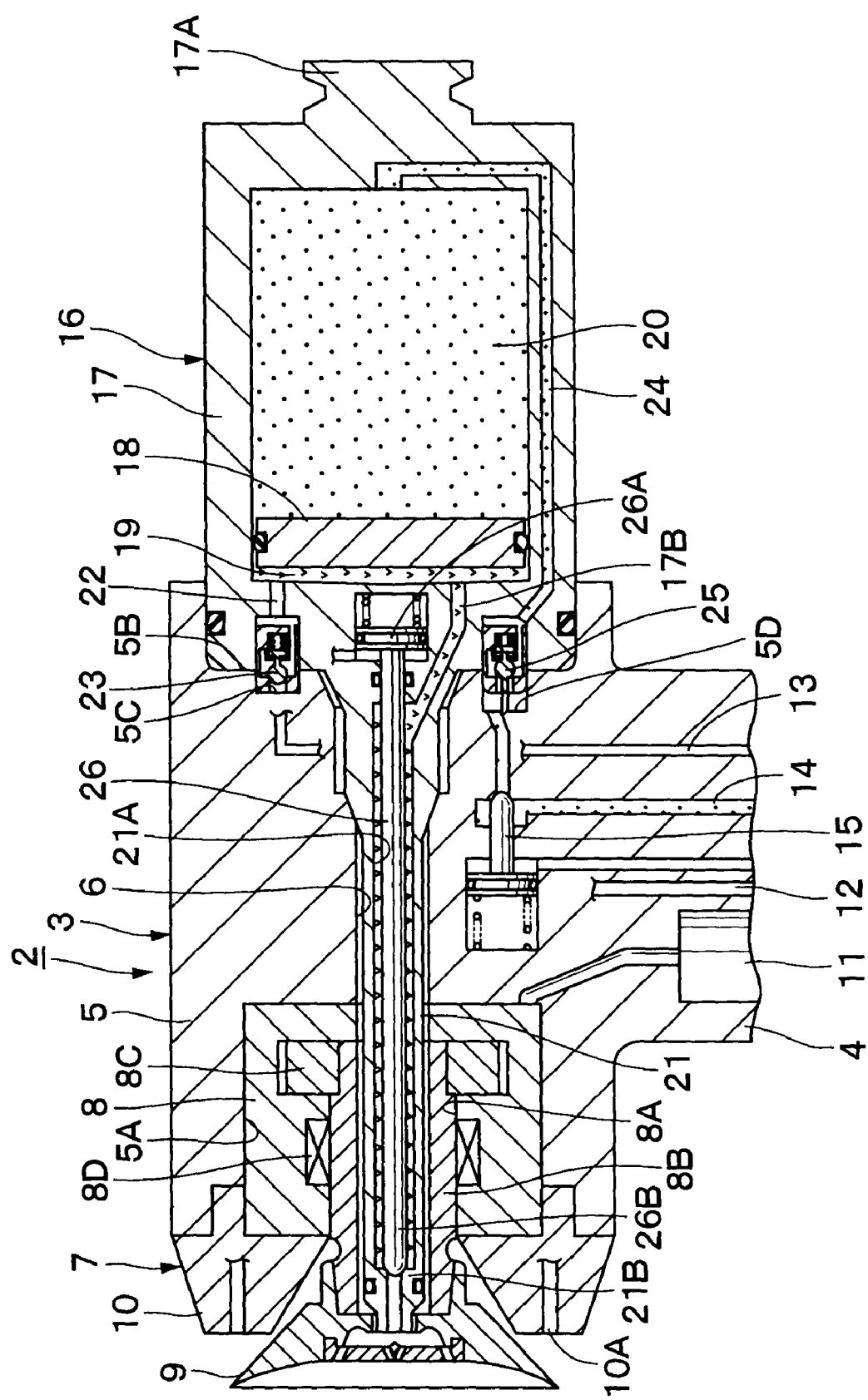
FIG. 2 is a longitudinal sectional view showing a rotary atomizing head type coating unit in FIG. 1 on an enlarged scale.

Indicated at 2 is a rotary atomizing head type coater unit (hereinafter referred to as "a coater unit 2") which is mounted on the coating robot 1. As shown in FIG. 2, the coater unit 2 is largely constituted by a housing 3, a sprayer 7 and a cartridge 16, which will be described hereinafter.

Denoted at 3 is a housing which is attached to a distal end of the wrist 1D of the coating robot 1. This housing 3 is constituted by a neck portion 4 which is detachably attached to a distal end of the wrist 1D of the coating robot 1, and a head portion 5 which is formed integrally on top of the neck portion 4.

In this instance, a sprayer unit mount portion 5A in the form of a cylindrical cavity is provided at a front end of the head portion 5. On the other hand, a cartridge mount portion 5B in the form of a cylindrical cavity is provided at a rear end of the head portion 5. Further, provided at the bottom of the cartridge mount portion 5B are a socket hole 5C to be held in a fitting engagement with a quick joint 23 of a cartridge 16 and a female connector portion 5D to be coupled with a quick joint 25 which will be described hereinafter. The socket hole 5C as well as the female connector portion 5D also has a function of setting a tank 17 in position in radial direction at the time of attaching the tank 17 of the cartridge 16 to the cartridge mount portion 5B.

Indicated at 6 is a feed tube passage hole which is extended centrally and axially of the head portion 5 to receive a feed tube 21 of the cartridge 16, which will be described hereinafter. Further, the feed tube passage hole 6 is formed axially through the coater mount portion 5A of the head portion 5 and a rotational shaft 8B of an air motor 8, which will be described hereinafter.

Designated at 7 is a sprayer which is mounted in the sprayer unit mount portion 5A on the head portion 5. This sprayer 7 is largely built of an air motor 8, which is composed of a motor case 8A, a rotational shaft 8B, an air turbine 8C and an air bearing 8D, a rotary atomizing head 9 which is put in rotation by the air motor 8 and adapted to atomize supplied paint into finely divided particles under the influence of centrifugal force and spray same toward a work piece, and a shaping air ring 10 which is located on the front side of the air motor 8.

A large number of shaping air outlet holes 10A is bored axially in outer peripheral side of the shaping air ring 10 (only two shaping air outlet holes are shown in the drawing). Through these shaping air outlet holes 10A, shaping air is spurted forward releasing edge of the rotary atomizing head 9 and to shape a spray pattern of paint particles which are released from the rotary atomizing head 9.

Indicated at 11 is a high voltage generator which is accommodated in the neck portion 4 of the housing 3. For example, the high voltage generator 11 is constituted by a Cockcroft circuit which is adapted to elevate a source voltage from a power source (not shown) to a level as high as −30 kV to −150 kV. Output side of the high voltage generator 11 is electrically connected, for example, to the air motor 8 to apply a high voltage to the rotary atomizing head 9 through the rotational shaft 8B of the air motor 8 for directly charging paint particles.

Denoted at 12 and 13 are a large number of air passages which are provided in the neck portion 4 of the housing 3 and connected to a control air source (not shown in the drawing). Supplied through these air passages 12 and 13 are turbine air, bearing air and brake air for the control of the air motor 8 as well as shaping air for shaping a paint spray pattern, in addition to pilot air to be applied to an extruding liquid valve 15 and a trigger valve 26. However, only a couple of air passages 12 and 13 are representatively shown in the drawings of the present embodiment.

Indicated at 14 is an extruding liquid passage on the side of the housing 3. One end of this extruding liquid passage 14 is connected to an extruding liquid feeder (not shown), while the other end is opened in a bottom portion of the female connector portion 5D of the cartridge mount portion 5B which is formed on the head portion 5.

Indicated at 15 is an extruding liquid valve which is provided in the head portion 5 of the housing 3. This extruding liquid valve 15 is adapted to normally block the extruding liquid passage 14 to suspend an extruding liquid supply to an extruding liquid chamber 20 of a cartridge 16. Whenever a pilot air is supplied, the extruding liquid valve 15 is opened to supply an extruding liquid to the extruding liquid chamber 20.

Now, a cartridge 16 which is detachably attached to the cartridge mount portion 5B on the head portion 5 is arranged in the manner as described below.

Figure 3:
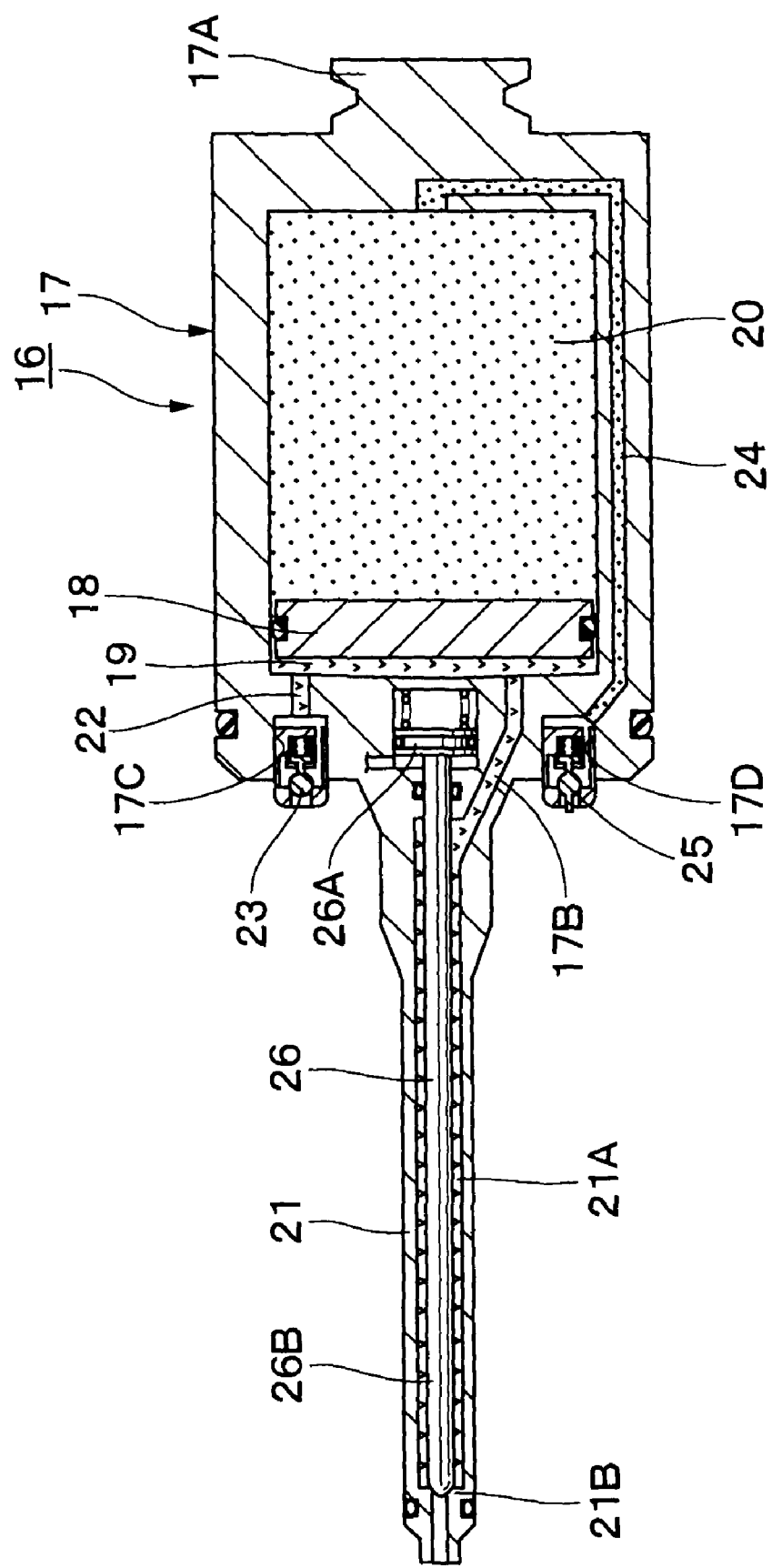
FIG. 3 is a longitudinal sectional view showing a cartridge of FIG. 2 alone.

As shown in FIG. 1, a plural number of cartridges 16 are detachably attached to a replenishing stool 33 of a paint feed mechanism 32, which will be described hereinafter. As shown in FIG. 3, each cartridge 16 is largely constituted by a tank 17, a piston 18 and a feed tube 21.

Denoted at 17 is a tank of a cartridge 16. This tank 17 is in the form of a tubular shaped container which is closed at opposite axial ends. A piston 18 is fitted internally of the tank 17 as a movable partition wall which can be displaced back and forth in an axial direction. The piston 18 defines the front part of the tank 17 as a paint chamber 19 and rear part as an extruding liquid chamber 20.

A grip portion 17A is projected from the rear end of the tank 17 to grip the cartridge for replacing operation. On the other hand, a paint passage 17B is formed through a fore end of the tank 17 to communicate the paint chamber 19 with a paint supply passage 21A in the feed tube 21, which will be described hereinafter. Further, for mounting quick joints 23 and 25, which will be described hereinafter, quick joint mount bores 17C and 17D are bored in the fore end of the tank 17, respectively.

Indicated at 21 is a feed tube which is extended axially forward on the front side of the tank 17. A fore distal end of the feed tube 21 is passed through the feed tube passage hole 6 and opened toward the rotary atomizing head 9. Further, a paint supply passage 21A is formed internally of the feed tube 21, in communication with the paint chamber 19 in the tank 17. Moreover, a valve seat 21B is provided at the fore distal end of the feed tube 21 by reducing a diameters of the paint supply passage 21A.

Figure 6:
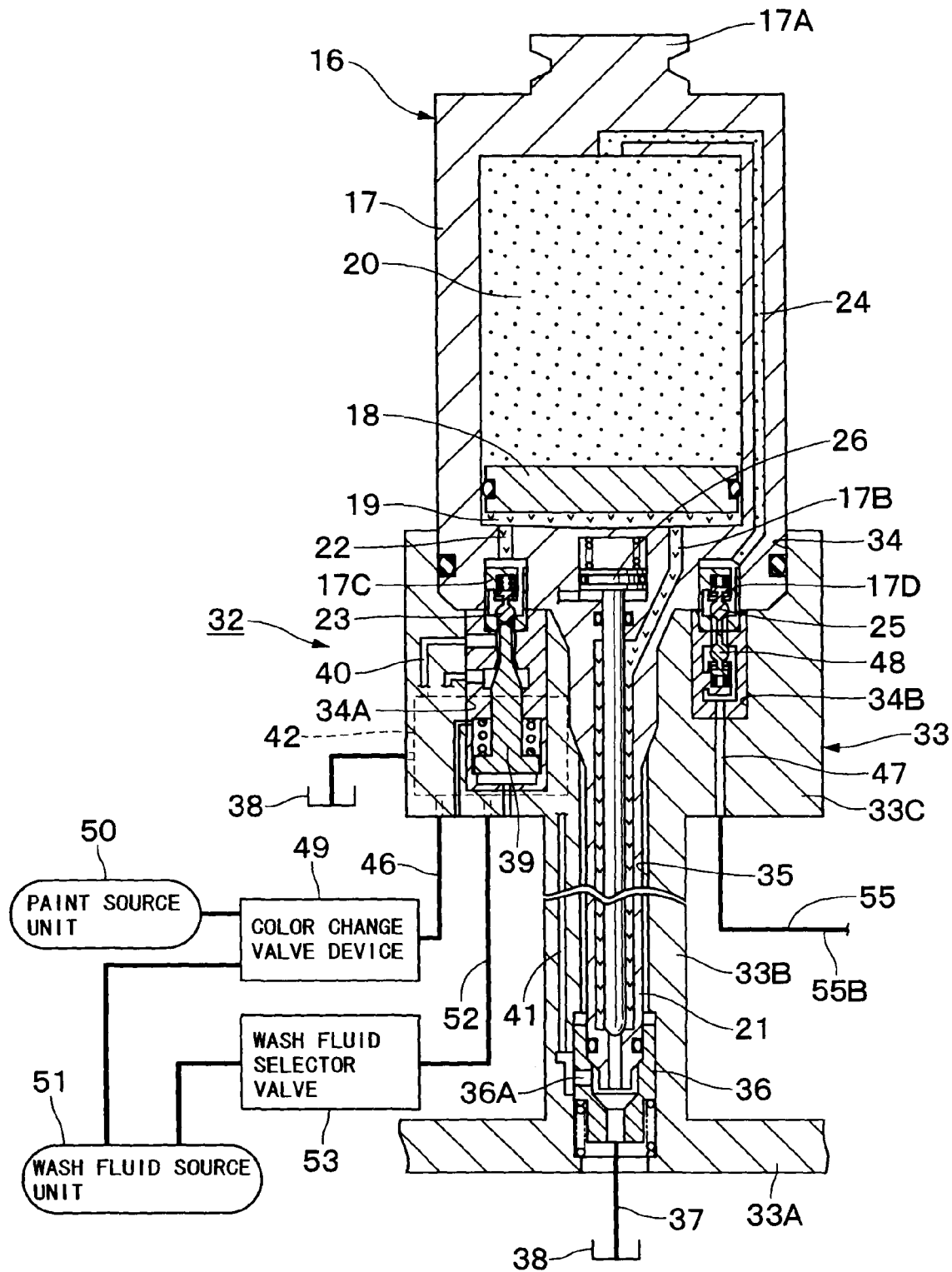
FIG. 6 is a vertical sectional view showing a paint feed mechanism in FIG. 5 on an enlarged scale.

Indicated at 22 is a paint passage on the side of the cartridge which is provided on the tank 17 in communication with a front portion of the paint chamber 19. As shown in FIG. 6, when set on a replenishing stool 33, which will be described hereinafter, this paint passage 22 is brought into communication with an outlet passage 40 of the paint replenishing stool 33.

Designated at 23 is a quick joint with a check valve, which is accommodated in the quick joint mount bore 17C on the tank 17 and located at a fore open end of the paint passage 22 on the side of the cartridge. This quick joint 23 is constituted by a valve case 23A protruding out of the quick joint mount bore 17C, a valve body 23B displaceably accommodated in the valve case 23A, a valve seat 23C to be seated on and off by the valve body 23B, and a valve spring 23D biasing the valve body 23B toward the valve seat 23C.

Figure 7:
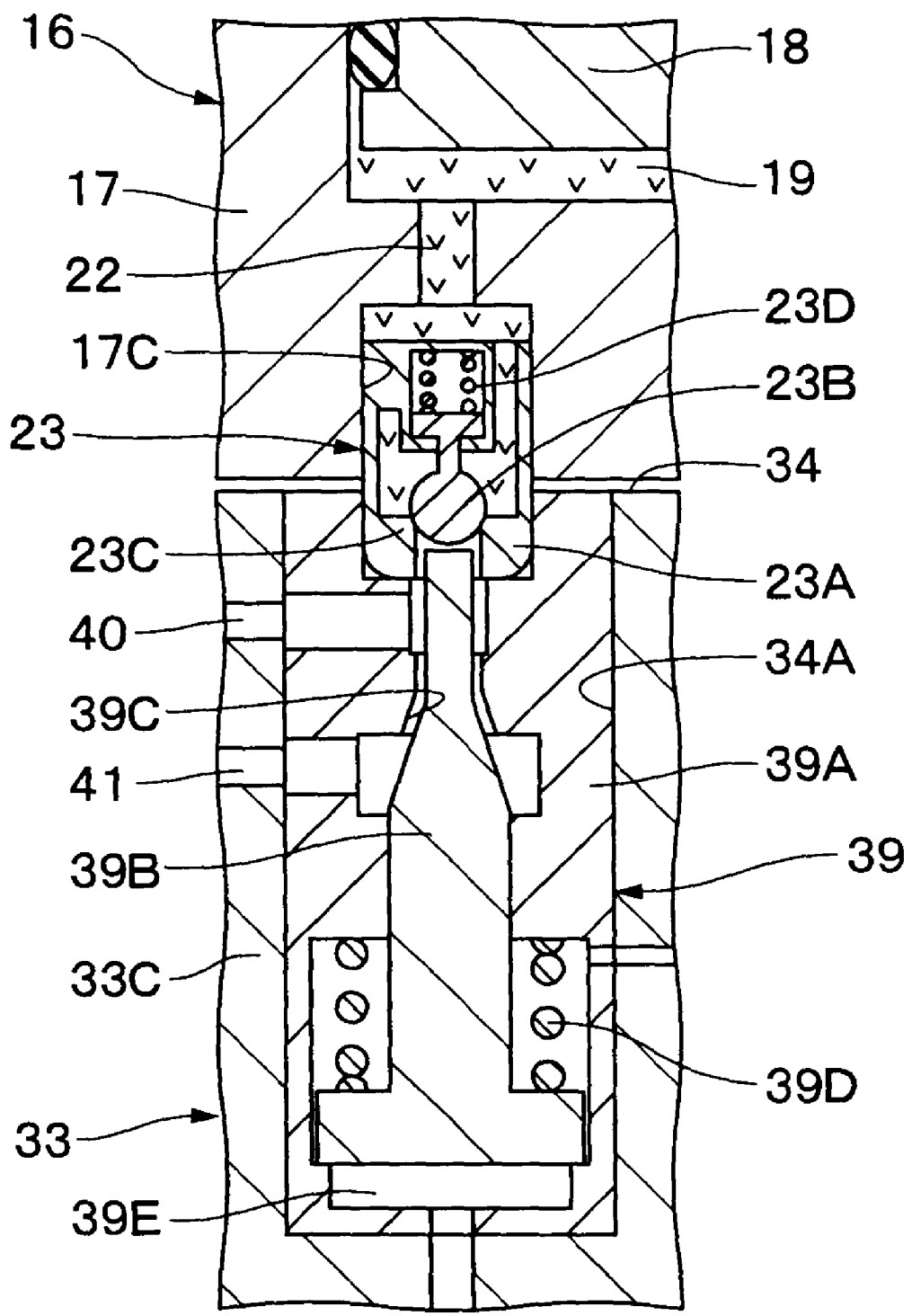
FIG. 7 is a fragmentary vertical sectional view showing on an enlarged scale a quick joint on a cartridge and a paint passage change-over valve of the paint feed mechanism.

As soon as the cartridge is set on a replenishing stool 33 as shown in FIGS. 2 and 7, the quick joint 23 opens when the valve body 23B is pushed by a valve body 39B of a paint passage change-over valve 39, which will be described hereinafter. On the other hand, the quick joint 23 is closed to prevent paint from flowing out of the paint passage 22 on the side of the cartridge, unless the valve body 23B is pushed opened by the valve body 39B.

Indicated at 24 is an extruding liquid passage on the side of the cartridge, which is formed on the tank 17 in communication with the extruding liquid chamber 20. This extruding liquid passage 24 is brought into communication with the extruding liquid passage 14 on the side of the housing when the cartridge 16 is set in the cartridge mount portion 5B on the head portion 5 as shown in FIG. 2. The extruding liquid passage 24 is also brought into communication with an extruding liquid passage 47 on the side of the replenishing stool when the cartridge 16 is set on a tank support portion 34 of the replenishing stool 33 as shown in FIG. 6.

Denoted at 25 is a quick joint with a check valve, which is accommodated in the quick joint mount bore 17D on the tank 17, and located at a position in communication with a fore open end of the extruding liquid passage 24 on the side of the cartridge. Along with a quick joint 48 which will be described hereinafter, the quick joint 25 constitutes a quick joint coupling with a check valve on both sides. Further, similarly to the above-described quick joint 23, the quick joint 25 is constituted by a valve case 25A protruding out of the quick joint mount bore 17D, a valve body 25B displaceably provided at the valve case 25A, a valve seat 25C to be seated on and off by the valve body 25B, and a valve spring 25D biasing the valve body 25B toward the valve seat 25C.

As shown in FIG. 2, the valve body 25B of the quick joint 25 is pushed open when the cartridge is attached on the housing 3 of the coater unit 2 or when the cartridge is set on a replenishing stool 33 of the paint feed mechanism 32 as shown in FIG. 6. On the other hand, when dismantled from the housing 3 or the replenishing stool 33 as shown in FIG. 3, the quick joint 25 is closed by the valve spring 25D, preventing an extruding liquid from flowing out of the extruding liquid passage 24 on the side of the cartridge.

Designated at 26 is a trigger valve which is provided at a front end portion of the tank 17. This trigger valve 26 plays a role of turning on and off a paint supply from the feed tube 21 to the rotary atomizing head 9. To this end, the trigger valve 26 is constituted by an axially displaceable piston 26A, and a valve body 26B having a fore end portion thereof extended through the paint supply passage 21A of the feed tube 21 to seat on and off the valve seat 21B.

On the other hand, indicated at 27 is a cartridge changer which is located in the vicinity of the coating robot 1. This cartridge changer 27 plays a role of replacing a cartridge 16 on the coater unit 2, and is largely constituted by a paint replenishing device 31 arrayed on a deck 27A which will be described hereinafter, and a cartridge transfer mechanism (not shown) which is adapted to grip and transfer a cartridge 16.

Following is a description on the paint replenishing device according to the present embodiment, which is provided on the deck 27A of the cartridge changer 27.

Figure 4:
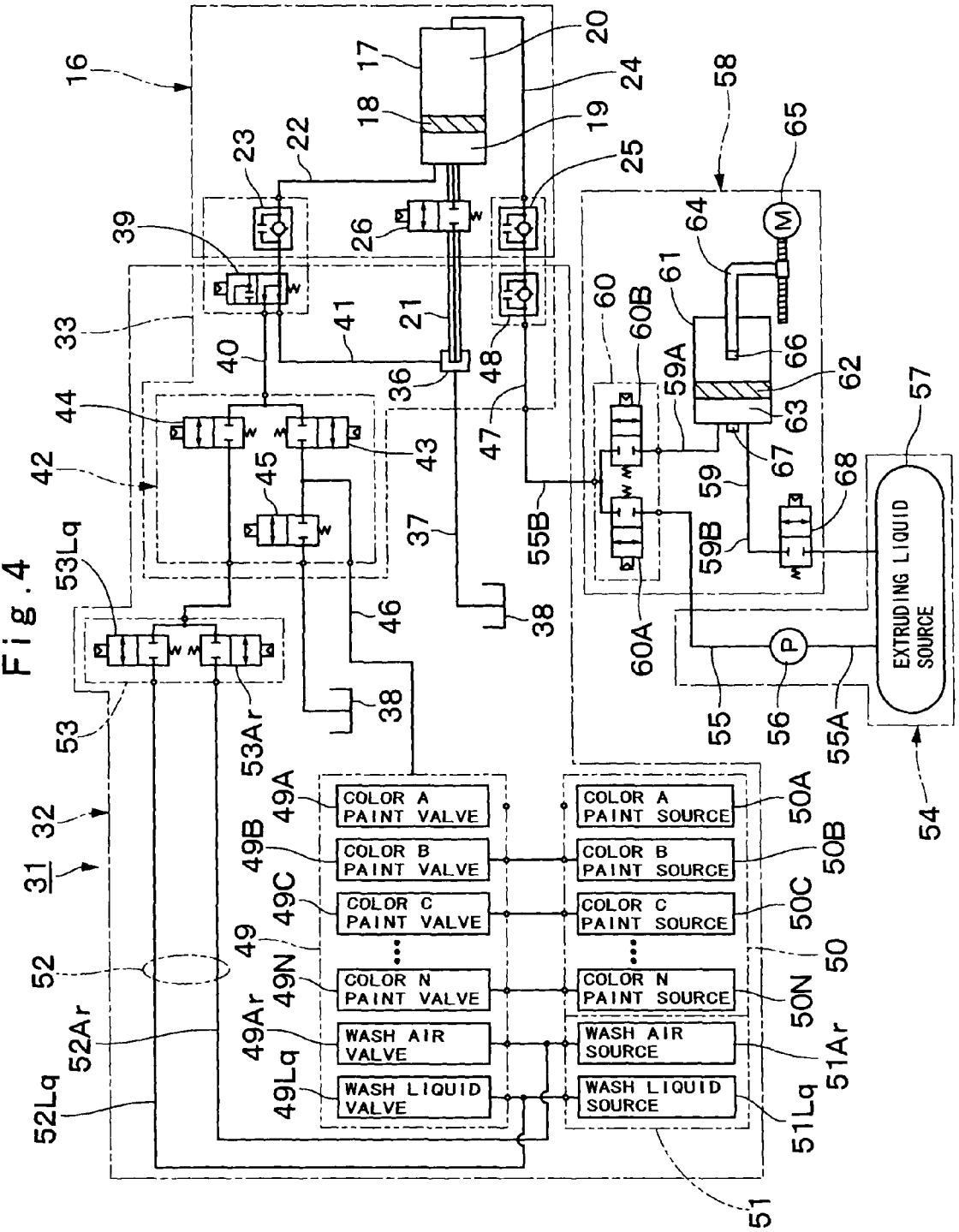
FIG. 4 is a circuit diagram of the paint replenishing system for a cartridge according to the first embodiment.
Figure 5:
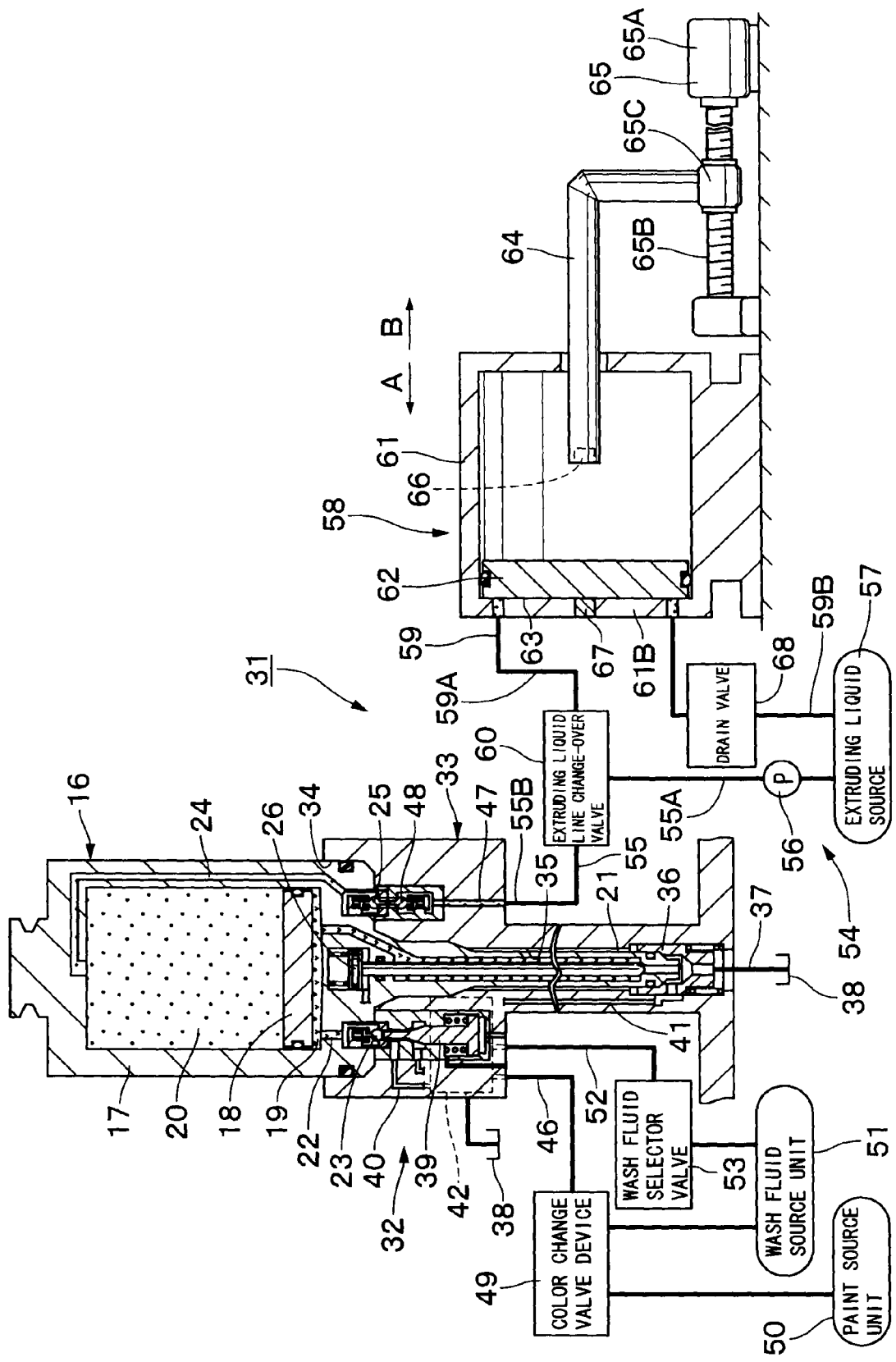
FIG. 5 is a vertical sectional view of the paint replenishing system for a cartridge according to the first embodiment.

This paint replenishing device 31 plays a role of replenishing cartridges 16 with paint. As shown in FIGS. 4 and 5, a paint replenishing device 31 is largely constituted by a paint feed mechanism 32, an extruding liquid feed mechanism 54 and a quantitation setup mechanism 58, which will be described hereinafter.

The paint feed mechanism 32 of the paint replenishing device 31 is arranged in the following manner to serve as a paint feed means.

Namely, indicated at 32 is a paint feed mechanism which is provided on the deck 27A of the cartridge changer 27. This paint feed mechanism 32 functions to feed paint to a paint chamber 19 of a cartridge 16, and is largely constituted by a replenishing stool 33, paint/wash fluid change-over valve 42 and a color change valve device 49 and the like which will be described hereinafter.

Indicated at 33 are replenishing stools which are mounted on the deck 27A of the cartridge changer 27. The replenishing stools 33 is largely constituted by a pedestal portion 33A fixed on the deck 27A by bolts or the like, a column portion 33B standing upright on the pedestal portion 33A, and a radially spread seat portion 33C which is provided at the top end of the column portion 33B.

Denoted at 34 is a tank support portion which is formed on top of the seat portion 33C and to which a tank 17 of a cartridge 16 is connectible. Provided separately at the bottom of the tank support portion 34 are a change-over valve mount cavity 34A and a quick joint mount cavity 34B for installation of a paint passage change-over valve 39 and a quick joint 48, respectively, which will be described hereinafter.

Indicated at 35 is a feed tube passage hole which is extended centrally and vertically through the replenishing stool 33. A feed tube 21 on the side of a cartridge 16 is inserted into this feed tube passage hole 35 when a tank 17 of a cartridge 16 is set in the tank support portion 34.

Further, indicated at 36 is a connector member which is provided vertically movably at the lower end of the feed tube passage hole 35. This connector member 36 is formed in a round tubular shape and connectible liquid tight at its upper end to a distal end of a feed tube 21 of a cartridge 16. Further, the lower end of the connector member 36 is connected to a waste liquid tank 38 through a waste liquid line 37.

On the other hand, bored around the connector member 36 is a radial port 36A in communication with a waste liquid passage 41 which will be described hereinafter. By way of this, a radial port 36A spray a fluid wash liquid which flow through the waste liquid passage 41 to the fore distal end of the feed tube 21 and wash deposited paint off.

Indicated at 39 is a paint passage change-over valve which is installed within the change-over valve mount cavity 34A in the tank support portion 34. This paint passage change-over valve 39 is connectible with the quick joint 23 on the side of a cartridge 16. In this instance, by means of the paint passage change-over valve 39, an outlet passage 40 in communication with a paint/wash fluid change-over valve 42, which will be described hereinafter, is switched between the cartridge 16 and a waste liquid passage 41 in communication with the waste liquid tank 38.

As shown in FIG. 7, the paint passage change-over valve 39 is installed in a change-over valve mount cavity 34A, and constituted by a valve case 39A which is connectible with the quick joint 23 at its top end through fit-in engagement with the latter, a valve body 39B displaceably provided within the valve case 39A, a valve seat 39C to be seated on and off by the valve body 39B at a position between the outlet passage 40 and the waste liquid passage 41, a valve spring 39D biasing the valve body 39B in a direction away from the valve seat 39C, and a pilot air chamber 39E for seating the valve body 39B on the valve seat 39C against the biasing action of the valve spring 39D.

In this instance, when a cartridge 16 is set on the replenishing stool 33, a distal end of the valve body 39B of the paint passage change-over valve 39 is kept away from the valve body 23B of the quick joint 23 on the side of the cartridge 16, keeping the quick joint 23 in a closed state. On the other hand, as soon as pilot air is supplied to the pilot air chamber 39E to displace the valve body 39B against the biasing action of the valve spring 39D, the valve body 23B of the quick joint 23 is pushed open by the valve body 39B of the paint passage change-over valve 39.

In this manner, the valve body 39B of the paint passage change-over valve 39 is usually kept away from the quick joint 23 by the action of the valve spring 39D, and as a result the outlet passage 40 and the waste liquid passage 41 are communicated with each other through the valve seat 39C as shown in FIG. 7. At this time, the quick joint 23 is left in a closed state, and paint or a wash fluid which is supplied from the paint/wash fluid change-over valve 42 through the outlet passage 40 is allowed to flow into the waste liquid passage 41 and discharged to the waste liquid tank 38 via the connector member 36 and waste liquid line 37.

On the other hand, as soon as air pressure is applied to the pilot air chamber 39E, the valve body 39B is displaced against the biasing action of the valve spring 39D and seated on the valve seat 39C pushing open the valve body 23B of the quick joint 23. As a result, the outlet passage 40 is blocked against communication with the waste liquid passage 41, and instead brought into communication with the paint supply passage 22 on the side of a cartridge. Thus, by way of the paint passage change-over valve 39, paint or a wash fluid which is supplied from the paint/wash fluid change-over valve 42 through the outlet passage 40 is charged into the paint chamber 19 through the quick joint 23 and the paint supply passage 22 on the side of the cartridge.

Indicated at 42 is a paint/wash fluid change-over valve which is provided internally of the tank support portion 34. This paint/wash fluid change-over valve 42 plays a role of selectively supplying either paint or a wash fluid to the paint passage change-over valve 39. Further, as shown in FIG. 4, the paint/wash fluid change-over valve 42 is composed of a paint feed valve 43, a wash fluid feed valve 44 and a waste liquid valve 45 formed as on-off valves. The paint feed valve 43 is opened at the time of a paint supply, and automatically closed as soon as a replenishment stop signal is received from a sensor 66, which will be described hereinafter, through a control unit.

On the other hand, a paint line 46 extended from a color change valve device 49 is connected between the paint feed valve 43 and the waste liquid valve 45, while the paint feed valve 43 is connected to the outlet passage 40. The wash fluid feed valve 44 is provided between a wash fluid selector valve 53 and the outlet passage 40.

At the time of a paint supply to the side of cartridge 16, the paint feed valve 43 is opened while the wash fluid feed valve 44 and waste liquid valve 45 are closed. Besides, the paint passage change-over valve 39 is changed over to a position for communicating the outlet passage 40 with the paint passage 22 on the side of the cartridge. Whereupon, paint which is supplied from a color change valve device 49, which will be described hereinafter, is fed to the cartridge 16 via the paint line 46, paint feed valve 43, outlet passage 40, paint passage change-over valve 39, quick joint 23 and paint passage 22 on the side of the cartridge.

On the other hand, at the time of discharging and washing away paint residues in the paint line 46 of the paint/wash fluid change-over valve 42 after replenishing operation, the waste liquid valve 45 is opened while the paint feed valve 43 and wash fluid feed valve 44 are closed. Whereupon, by a wash fluid which is supplied from the color change valve device 49, paint residues in the paint line 46 are washed away and discharged to the waste liquid tank 38.

Further, at the time of discharging and washing away paint residues in the outlet passage 40 after a paint replenishing operation, the wash fluid feed valve 44 is opened while the paint feed valve 43 and waste liquid valve 45 are closed. Besides, the paint passage change-over valve 39 is changed over to a position for communicating the outlet passage 40 with the waste liquid passage 41. Whereupon, a wash fluid which is supplied from a wash fluid source unit 51, which will be described hereinafter, is discharged to the tank 38 via the wash fluid selector valve 53, wash fluid feed valve 44, outlet passage 40, paint passage change-over valve 39, waste liquid passage 41, connector member 36 and waste liquid line 37, to wash the outlet passage 40 clean.

Indicated at 47 is an extruding liquid passage which is provided in the seat portion 33C of the replenishing stool 33. This extruding liquid passage 47 is provided to connect a quick joint 48 with an extruding liquid line 55, which will be described hereinafter.

Denoted at 48 is a quick joint with a check valve, which is provided in the quick joint mount cavity 34B of the tank support portion 34, in communication with an open end of an extruding liquid passage 47 on the side of the replenishing stool. Along with the quick joint 25 on the side of a cartridge 16, this quick joint 48 constitutes a quick joint coupling with a check valve on both sides. Further, substantially in the same way as the afore-mentioned quick joint 25 for an extruding fluid, the quick joint 48 is constituted by a valve case 48A, a valve body 48B, a valve seat 48C and a valve spring 48D.

Figure 8:
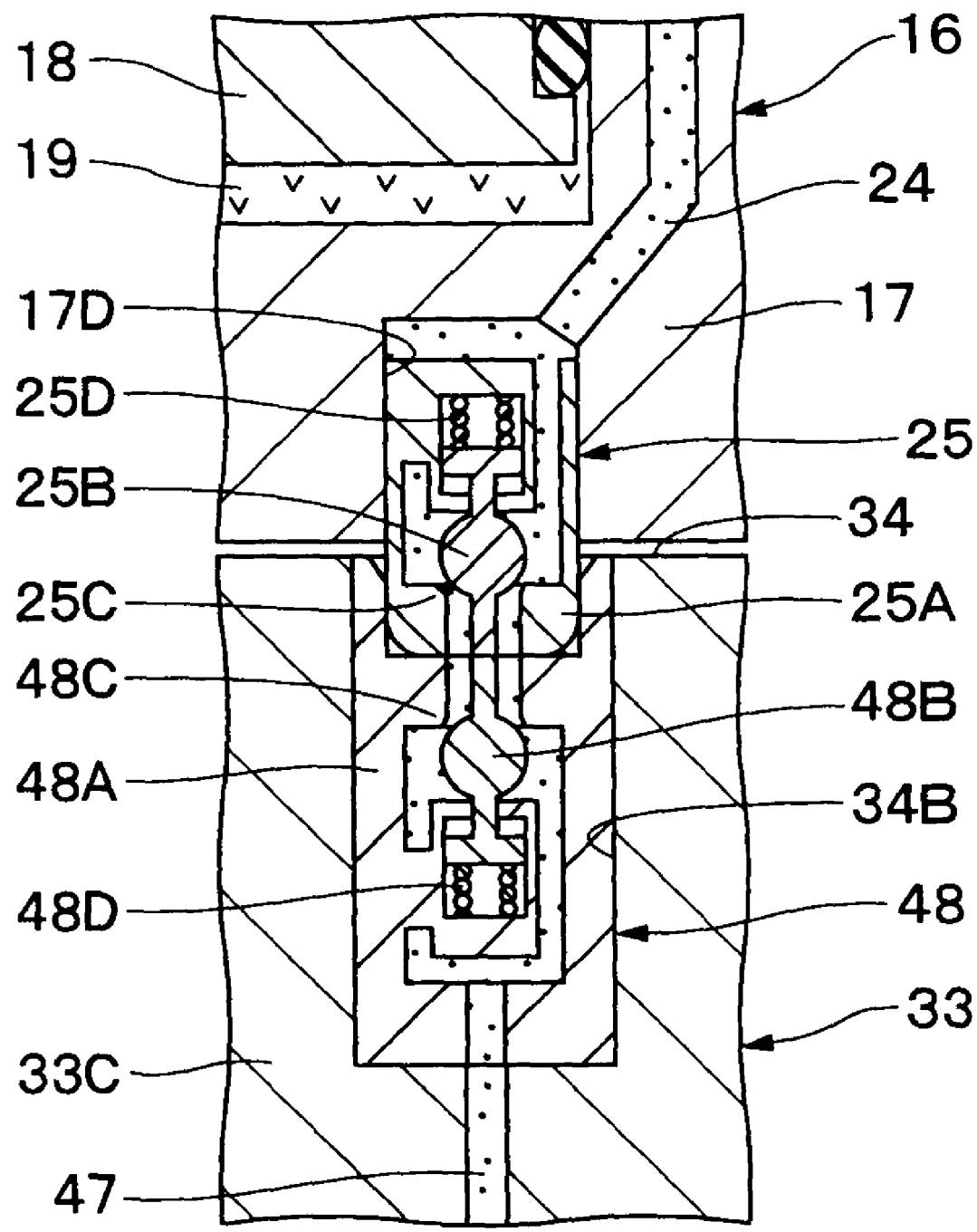
FIG. 8 is a fragmentary vertical sectional view showing on an enlarged scale the quick joint on the part of a cartridge and a quick joint on the part of the paint feed mechanism in FIG. 6.

Further, when a cartridge 16 is set in the tank support portion 34 on the replenishing stool 33 as shown in FIG. 8, by confronting the valve body 48B to the opposing valve body 25B of the quick joint 25, both quick joints 25, 48 open and connect the extruding liquid passage 47 on the side of the replenishing stool to the extruding liquid passage 24 on the side of the cartridge. On the other hand, as soon as the cartridge 16 is dismantled from the replenishing stool 33, the quick joint 48 is closed to prohibit effluence of an extruding liquid from the extruding liquid passage 47.

Now, following are descriptions on a color change valve device 49 which constitutes a paint feed mechanism 32, and on a paint source unit 50 and a wash fluid source unit 51 which are connected to the color change valve device 49.

Namely, indicated at 49 is a color change valve device which is provided in communication with the paint line 46. This color change valve device 49 plays a role of selecting paint of a specified color from a number of paint colors and feeding the selected paint to the paint line 46 for replenishment of a cartridge 16. Besides, the color change valve device 49 also plays a role of feeding wash fluids such as a wash liquid and washes air to the paint line 46. For these purposes, the color change valve device 49 is provided with paint valves 49A, 49B, 49C through 49N for paint colors A, B, C through N, along with a wash liquid valve 49Lq and a wash air valve 49Ar.

The paint valves 49A, 49B, 49C through 49N of colors A, B, C through N are connected to paint sources 50A, 50B, 50C through 50N of colors A, B, C through N at the paint source unit 50, respectively which will be described hereinafter. The wash liquid valve 49Lq is connected to a wash liquid source 51Lq at a wash fluid source unit 51, which will be described hereinafter, while the wash air valve 49Ar is connected to a wash air source 51Ar.

Designated at 50 is a paint source unit, including paint sources 50A, 50B, 50C through 50N of colors A, B, C through N, respectively. These paint sources 50A, 50B, 50C through 50N are connected to paint valves 49A, 49B, 49C through 49N, respectively.

Indicated at 51 is a wash fluid source unit, including a wash liquid source 51Lq and a wash air source 51Ar. The wash liquid source 51Lq is connected to a wash liquid valve 49Lq, while the wash air source 51Ar is connected to a wash air feed valve 49Ar of the color change valve device 49.

In this instance, the wash liquid source 51Lq and wash air source 51Ar of the wash fluid source unit 51 are also connected to a wash fluid feed valve 44 of the paint/wash fluid change-over valve 42 by means of bypass lines 52 consisted of a couple of bypass lines 52Lq and 52Ar via a wash fluid selector valve 53. The wash fluid selector valve 53 is composed of a wash liquid valve 53Lq and a wash air valve 53Ar thereby to selectively supply a wash liquid or wash air to the wash fluid feed valve 44.

Next, the extruding liquid feed mechanism 54 serving as an extruding liquid feed means of the paint replenishing device 31 is arranged in the manner as described below.

Figure 9:
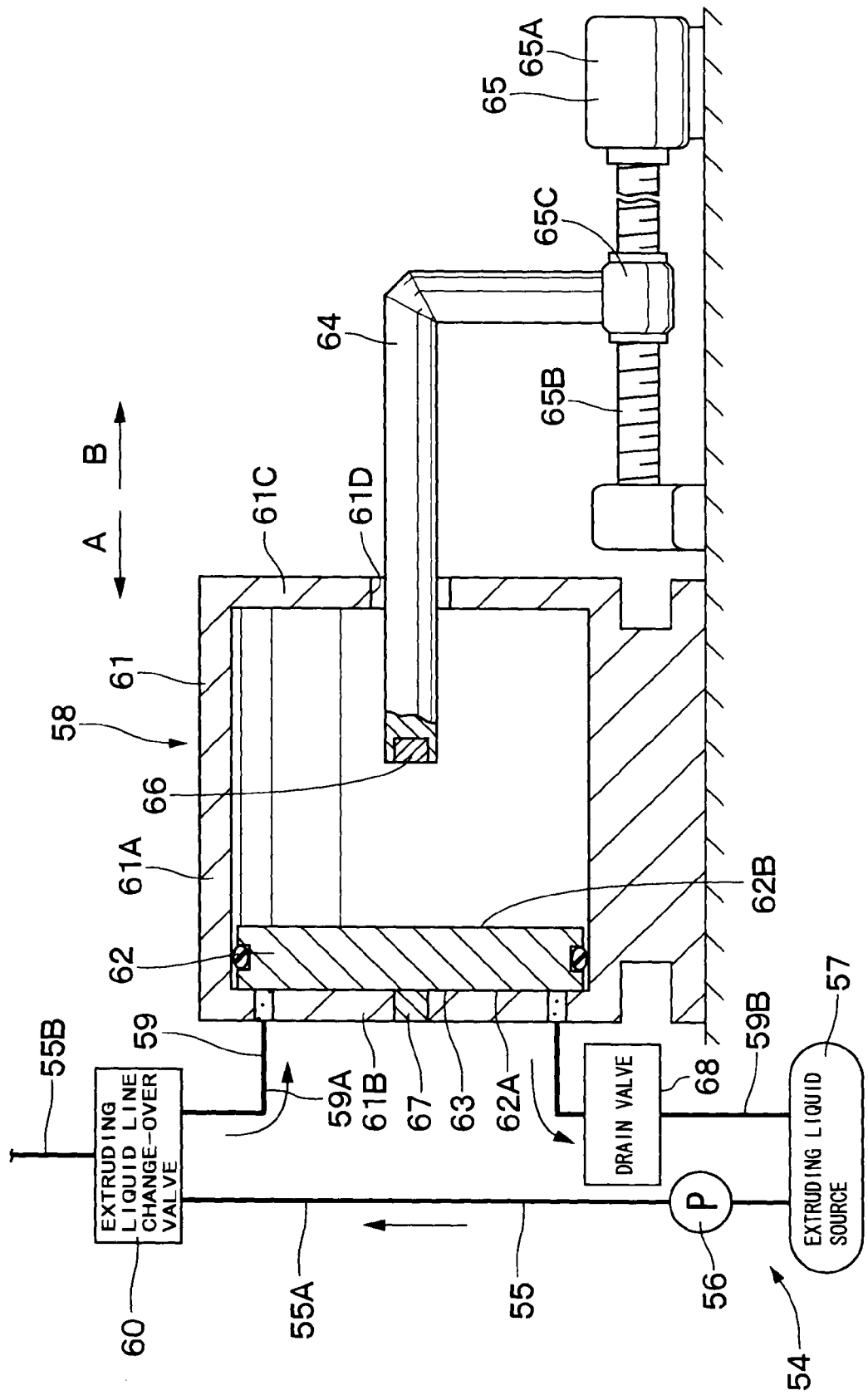
FIG. 9 is a vertical sectional view showing on an enlarged scale a quantitation setup means in FIG. 5.

Namely, indicated at 54 is an extruding liquid feed mechanism which is provided in communication with the extruding liquid passage 47 on the side of a replenishing stool of the paint feed mechanism 32. This extruding liquid feed mechanism 54 plays a role of feeding an extruding liquid toward a extruding liquid chamber 20 in a cartridge 16 and discharging paint residues in a paint chamber 19. As shown in FIG. 9, the extruding liquid feed mechanism 54 is largely constituted by an extruding liquid line 55, a pump 56 and an extruding liquid source 57 serving as storage of an extruding liquid, as described hereinafter.

Indicated at 55 is an extruding liquid line as a supply passage for an extruding liquid. This extruding liquid line 55 is connected between the extruding liquid source 57 and a extruding liquid passage 47 on the side of a replenishing stool 33, and includes a supply line 55A which is connected to the extruding liquid source 57 through an extruding liquid line change-over valve 60, which will be described hereinafter, and a common line 55B which is connected to the extruding liquid passage 47 on the side of replenishing stool. In this instance, the common line 55B is used for both supply and return of an extruding liquid. A pump 56 is provided in the course of the supply line 55A as described below.

Namely, indicated at 56 is a pump which is provided in the supply line 55A of the extruding liquid line 55 which is connected from the extruding liquid source 57, to feed an extruding liquid toward a cartridge 16.

Further, a quantitation setup mechanism 58 serving as a quantitative replenishment control means, which is included in the paint replenishing device 31 is arranged in the manner as described below.

Namely, indicated at 58 is a quantitation setup mechanism which is connected to the extruding liquid line 55. By this quantitation setup mechanism 58, a quantity of paint to be replenished into a paint chamber 19 of a cartridge 16 is set depending upon conditions of a next paint coating operation. More particularly, the quantitation setup mechanism 58 has a function of outputting a replenishment stop signal to the paint feed valve 43 to turn off a paint supply by the paint feed mechanism 32 as soon as a preset amount of extruding liquid is displaced and discharged out of an extruding liquid chamber 20 as a result of paint charging into its paint chamber 19.

As shown in FIGS. 4 and 9, the quantitation setup mechanism 58 is constituted by a return line 59, an extruding liquid line change-over valve 60, a quantitation tank 61, a piston 62, a metering chamber 63, a support arm 64, a quantitation setup portion 65, a sensor 66 and a drain valve 68 which will be described hereinafter.

Indicated at 59 is a return line which is connected between the extruding liquid line 55 and the extruding liquid source 57. This return line 59 is constituted by an inlet line 59A connecting an extruding liquid line change-over valve 60 with a quantitation tank 61, and a drain line 59B connecting the quantitation tank 61 with the extruding liquid source 57, as described below.

Denoted 60 is an extruding liquid line change-over valve which is provided between the supply line 55A and the common line 55B of the extruding liquid line 55. This extruding liquid line change-over valve 60 is constituted by a feed valve 60A and a return valve 60B. At the time of feeding an extruding liquid to the extruding liquid chamber 20 of the cartridge 16, the feed valve 60A is opened to bring the supply line 55A into communication with the common line 55B. On the other hand, the return valve 60B is opened at the time of returning an extruding liquid from the extruding liquid chamber 20 of the cartridge 16 to the quantitation tank 61, to bring the common line 55B into communication with an inlet line 59A of the return line 59.

Indicated at 61 is a quantitation tank which is connected with the return line 59. This quantitation tank 61 is constituted by a tubular body 61A, a front lid portion 61B which closes a front end of the tubular body 61A, and a rear lid portion 61C which closes a rear end of the tubular body 61A. Connected to the front lid portion 61B are the inlet line 59A and drain line 59B of the return line 59 for communication with a metering chamber 63, which will be described hereinafter. On the other hand, an arm through hole 61D is bored in the rear lid portion 61C to receive a support arm 64, which will be described hereinafter.

Denoted at 62 is a piston which is fitted in the quantitation tank 61 as a movable partition wall, which is movable in an axial direction (in the direction of arrow A or B). By the piston 62, a metering chamber 63 is defined between the front face 62A and the front lid portion 61B of the quantitation tank 61. Further, the rear end face 62B of the piston 62 is used as a sensing surface of the sensor 66 in detecting a distance of displacement of the piston 62 based on the rear end face 62B in a metering operation which will be described hereinafter.

The piston 62 is pushed in the direction of arrow B when an extruding liquid is introduced into the metering chamber 63, and moved in the direction of arrow A when pushed by the support arm 64, which will be described hereinafter.

In this instance, an extruding liquid which is discharged from an extruding liquid chamber 20 of a cartridge 16 is introduced into the metering chamber 63. At this time, the extruding liquid is pushed out through a piston 18 by paint which is replenished to the paint chamber 19 of the cartridge 16. Therefore, the amount of an extruding liquid which is pushed out of the extruding liquid chamber 20 of the cartridge 16 is equivalent to the amount of paint replenishment into the paint chamber 19. Thus, the amount of paint replenishment into the paint chamber 19 of the cartridge 16 can be detected accurately by measuring the amount of this extruding liquid.

In this regard, it is conceivable to measure a flow rate of the discharged extruding liquid through the return line 59 by the use of a flow meter instead of the quantitation setup mechanism 58. However, the use of a flow meter is unsuitable because generally a flow meter is low in accuracy of measurement and particularly unsuited for measurement of a liquid at a small flow rate, so that due to accumulation of measurement errors it would be difficult for a flow meter to measure correctly the discharge of the extruding liquid from the extruding liquid chamber 20.

Indicated at 64 is a support arm which constitutes part of the quantitation setup portion 65, supporting a sensor 66 at its distal end, which will be described hereinafter. In cooperation with and by way of the quantitation setup portion 65 which will be described hereinafter, the support arm 64 can be moved to push the piston 62 in the direction of arrow A as far as a position at which the inner space of the metering chamber 63 is reduced to a minimum volume. From a proximal end which is mounted on a shifting member 65C of the quantitation setup portion 65, the support arm 64 is extended horizontally in a forward direction to advance into the tank 61 through the rear lid portion 61C. Thus, the support arm 64 can be moved in the directions of arrows A and B by the quantitation setup portion 65.

Denoted at 65 is a quantitation setup portion which is provided on the rear side of the quantitation tank 61. This quantitation setup portion 65 is provided for moving the support arm 64 in the directions of arrows A and B which will be the movable direction for the piston 62. In order to locate the sensor 66, which will be described hereinafter, correctly at an aimed position of quantitation, the quantitation setup portion 65 control rotation of the ball screw 65B by a servo motor 65A and move a shifting member 65C which the support arm 64 is mounted, along the ball screw 65B.

Indicated at 66 is a sensor which is attached on the fore distal end of the support arm 64 for detecting the position of the rear face 62B of the piston 62. For example, a contacting type sensor such as a limit switch, which is adapted to detect the position of the rear face 62B of the piston 62 by contact therewith, is employed as the sensor 66 in the particular embodiment shown. A non-contacting type sensor such as optical sensor, magnetic sensor or ultrasound sensor may be used for the sensor 66 if desired.

Further, the sensor 66 is connected to a control unit (not shown) which is at the control of the paint replenishing device 31. The sensor 66 outputs a replenishment stop signal to the control unit upon detection of abutment against of the piston 62, namely, as soon as the metering chamber 63 is filled with a predetermined amount of a discharged extruding liquid. In addition, a valve closing signal is output to paint feed valve 43 of the paint/wash fluid change-over valve 42 from the control unit to stop paint replenishment by the paint feed mechanism 32.

The paint supply by the paint feed mechanism 32 can be stopped to end a paint quantitation even when one of color change valve device 49, the color A paint valve 49A through to the color N paint valve 49N, is closed by a replenishment stop signal from the sensor 66. Further, the quantitative paint replenishment can be ended when both of the paint feed valve 43 and one of the color A paint valve 49A through to the color N paint valve 49N are closed by a replenishment stop signal.

Indicated at 67 is an initial position sensor which is provided on the front lid portion 61B of the quantitation tank 61. This initial position sensor 67 is provided for the purpose of detecting the position of a front face 62A of the piston 62. Similarly to the sensor 66 mentioned above, for example, a limit switch, optical sensor, a magnetic sensor or ultrasound sensor can be used for the initial position sensor 67.

The initial position sensor 67 is connected to a control unit of the paint replenishing device 31. The initial position sensor 67 outputs an initial position detection signal to the control unit when the piston 62 is located in an initial position, reducing the inner space of the metering chamber 63 to a minimal volume. By this initial position detection signal, the paint feed mechanism 32 is permitted to proceed to a next replenishing operation, and after washing operation, the servo motor 65A of the quantitation setup portion 65 which consist the quantitation setup mechanism 58 is driven to set the support arm 64 at a specific quantitation position.

Indicated at 68 is a drain valve which is provided in the drain line 59B of the return line 59. This drain valve 68 is closed when an extruding liquid is introduced into the metering chamber 63. On the other hand, the drain valve 68 is opened when discharging an extruding liquid from the metering chamber 63, returning the discharged extruding liquid from the metering chamber 63 to the extruding liquid source 57.

Being arranged as described above, the paint replenishing device 31 of the present embodiment is put in operation for replenishing the cartridge 16 in the manner as described in greater detail below with reference to time charts of FIGS. 13 and 14.

Figure 13:
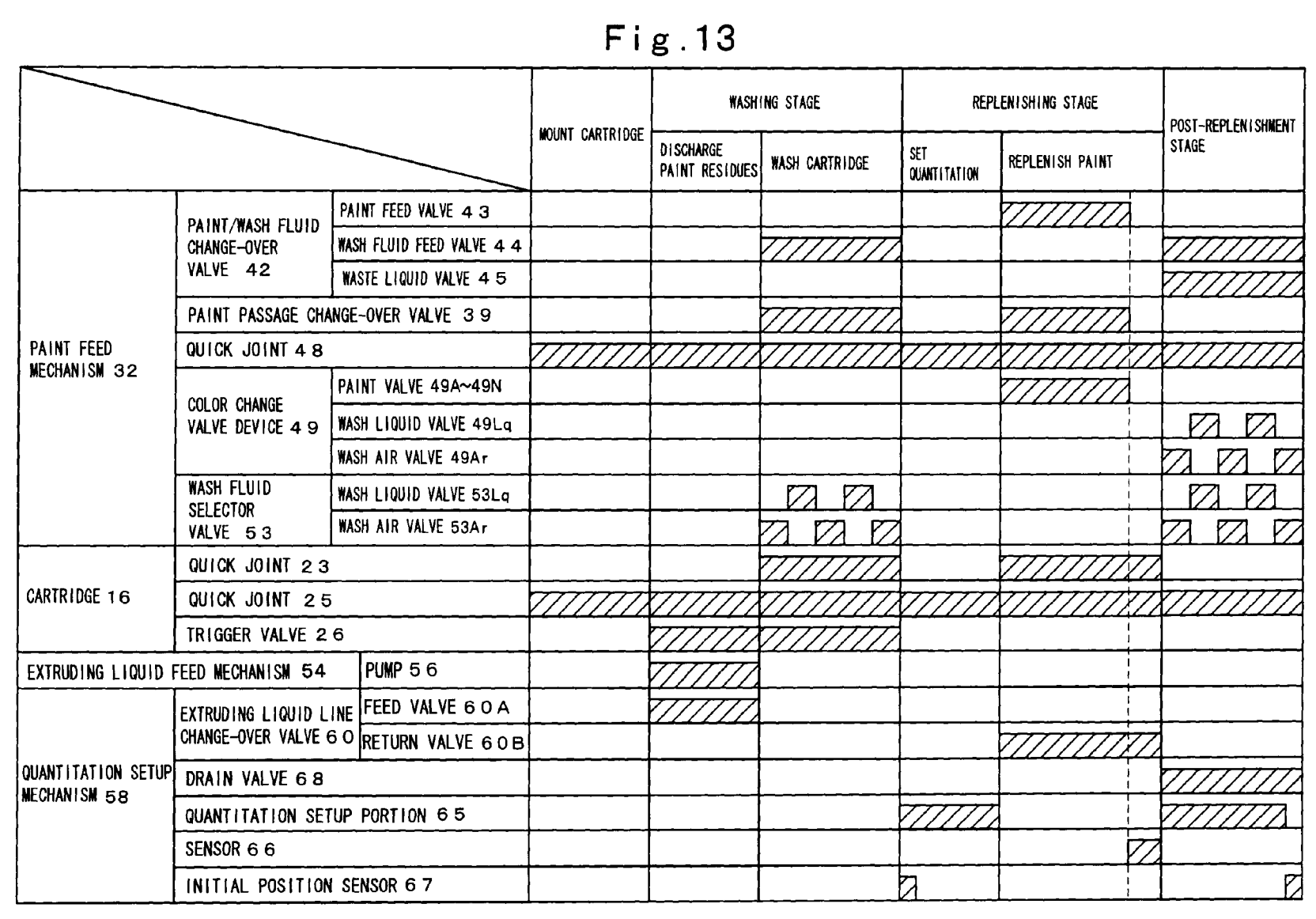

Firstly, shown in FIG. 13 is a time chart for replenishing a cartridge 16 with a different color paint after a color change.

In an initial state, the cartridge 16 is finished using in a previous paint coating operation and there are residues of the previous color remain in the paint chamber 19. On the other hand, within the quantitation tank 61 of the quantitation setup mechanism 58, the piston 62 is located in an initial position in close proximity of an initial position sensor 67 (with the inner space of the metering chamber 63 reduced to a minimum volume).

Now, a paint replenishing operation is started with a cartridge mounting stage in which a cartridge 16 with residues of a previous color is mounted and set on a replenishing stool 33. Namely, a cartridge 16 to be replenished with paint of a different color by the paint replenishing device 31 is set on a replenishing stool 33 of the paint feed mechanism 32. At this time, the quick joint 25 on the side of the cartridge 16 and the quick joint 48 on the side of the replenishing stool 33 are coupled with each other in an opened state.

Next, it will transfer to the cartridge washing stage to wash the cartridge 16 after mounting it on the replenishing stool 33.

In the washing stage, firstly residues of a previous color which remain in the paint chamber 19 of the cartridge 16 after a previous paint coating operation are discharged to the outside by the extruding liquid feed mechanism 54. For discharging paint residues operation, the feed valve 60A of the extruding liquid line change-over valve 60 is switched to opened position, and the pump 56 is put in operation. As a result, an extruding liquid from the extruding liquid source 57 is supplied to the extruding liquid chamber 20 through the extruding liquid line 55, extruding liquid passage 47 on the side of the replenishing stool and extruding liquid passage 24 on the side of the cartridge.

Figure 10:
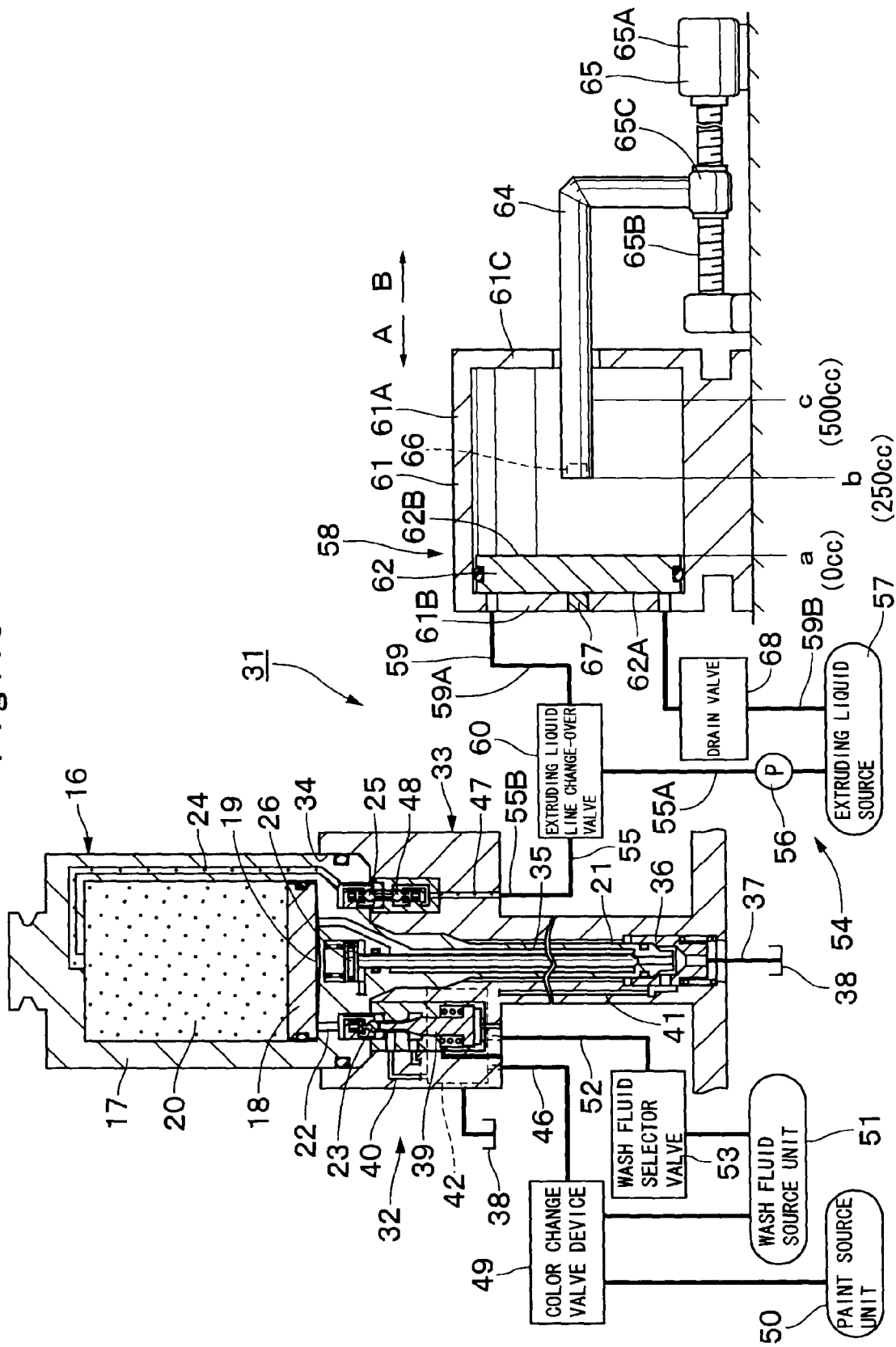
FIG. 10 is a schematic illustration of the paint replenishing system for a cartridge with a piston of the quantitation setup means located in an initial position.

Consequently, as shown in FIG. 10, the piston 18 is pushed toward the feed tube 21 by the extruding liquid introduced into the extruding liquid chamber 20, to discharge paint residues in the paint chamber 19 to the waste liquid tank 38 through the paint supply passage 21A in the feed tube 21 as the inner space of the paint chamber 19 is contracted to a minimum volume.

After discharging residual paint of a previous color from the paint chamber 19 of the cartridge 16 in this manner by contracting the paint chamber 19 to a minimum volume, the washing operation then proceed to a cartridge washing stage to wash away paint residues and deposits of a previous color from the paint chamber 19 of the cartridge 16 and the paint supply passage 21A of the feed tube 21 or the like by the paint feed mechanism 32.

In the cartridge washing stage, the valve body 39B of the paint passage change-over valve 39 is displaced against the action of the valve spring 39D to push open the valve body 23B of the quick joint 23, bringing the outlet passage 40 into communication with the paint passage 22 on the side of the cartridge. Further, the wash fluid feed valve 44 of the paint/wash fluid change-over valve 42 is opened. In this state, the wash air valve 54Ar and wash liquid valve 53Lq of the wash fluid selector valve 53 are opened alternately, letting wash air and wash liquid from the wash air source 51Ar and wash liquid source 51Lq of the wash fluid source unit 51 gush into the paint chamber 19. In this state, since the trigger valve 26 of the cartridge 16 is open, wash fluids are allowed to flow forward of the paint chamber 19 through the paint supply passage 21A of the feed tube 21 to wash away residues and deposits of a previous color from the paint chamber 19 and feed tube 21 to the waste liquid tank 38.

After washing the cartridge 16 in this manner in the above-described cartridge washing stage, the operation then proceeds to a paint replenishing stage, refilling paint to the paint chamber 19.

The paint replenishing stage consist of a quantitation setting operation setting quantitation of replenishing paint to the paint chamber 19 and a replenishing operation feeding paint to the paint chamber 19.

First of all, the quantitation setup mechanism 58 is set up to a given quantitation setting in the manner as follows. In this operation, on the basis of an initial position detection signal from the initial position sensor 67 in detection of the front face 62A of the piston 62, a check is made as to whether or not the quantitation setup mechanism 58 is in a ready position. After this, the servo motor 65A of the quantitation setup portion 65 is put in rotation to shift the position of the sensor 66 along with the support arm 64 in the direction of arrow A or B.

At this time, when the front face 62A of the piston 62 is abutted against the front lid portion 61B of the quantitation tank 61 as shown in FIG. 10 (when the front face 62A of the piston 62 is detected by the initial position sensor 67), the rear face 62B is assumed to be in an initial position a, spaced by predetermined distances, for example, from quantitation setting positions b and c in the direction of arrow B.

In this instance, in order to explain the quantitation setting procedures more clearly, when the rear face 62B of the piston 62 is located at the initial position a, a quantity of an extruding liquid which is charged into the metering chamber 63 will be 0 cc, 250 cc when at the setting position b and 500 cc when at the setting position of c, respectively. These quantities of replenishment are determined depending on a demand from the side of the cartridge 16 to be replenished, and therefore not necessarily limited to the exemplified quantities 250 cc and 500 cc.

Namely, in a case where 250 cc of paint is to be replenished into the paint chamber 19 of the cartridge 16, the position of the support arm 64 is shifted in the direction of arrow B to locate the sensor 66 at the fore distal end of the support arm 64 at the setting position b as shown in FIG. 10.

After setting the quantitation of the replenishing paint in the paint chamber 19, then proceed to paint replenishing operation. In this step, the return valve 60B of the extruding liquid line change-over valve 60 is opened while the drain valve 68 is closed by the control unit. Further, the paint passage change-over valve 39 is changed over to open the quick joint 23, and the paint feed valve 43 of the paint/wash fluid change-over valve 42 is opened as well. In this state, for example, a color A paint valve 49A of the color change valve device 49 is opened. Whereupon, paint of color A from the color A paint source 50A of the paint source unit 50 is fed forward and replenished into the paint chamber 19 of the cartridge 16 through the paint line 46, paint feed valve 43, outlet passage 40 and paint passage 22 on the side of the cartridge and the like.

At this time, in step with the paint replenishment into the paint chamber 19, an equivalent amount of an extruding liquid is displaced and discharged from the extruding liquid chamber 20 and introduced into the metering chamber 63 of the quantitation tank 61 through the extruding liquid passage 24 on the side of the cartridge, extruding liquid passage 47 on the side of the replenishing stool, extruding liquid line 55, return valve 60B of the extruding liquid line change-over valve 60 and inlet line 59A of the return line 59. As a result, the piston 62 in the quantitation tank 61 is displaced in the direction of arrow B from the initial position a.

Figure 11:
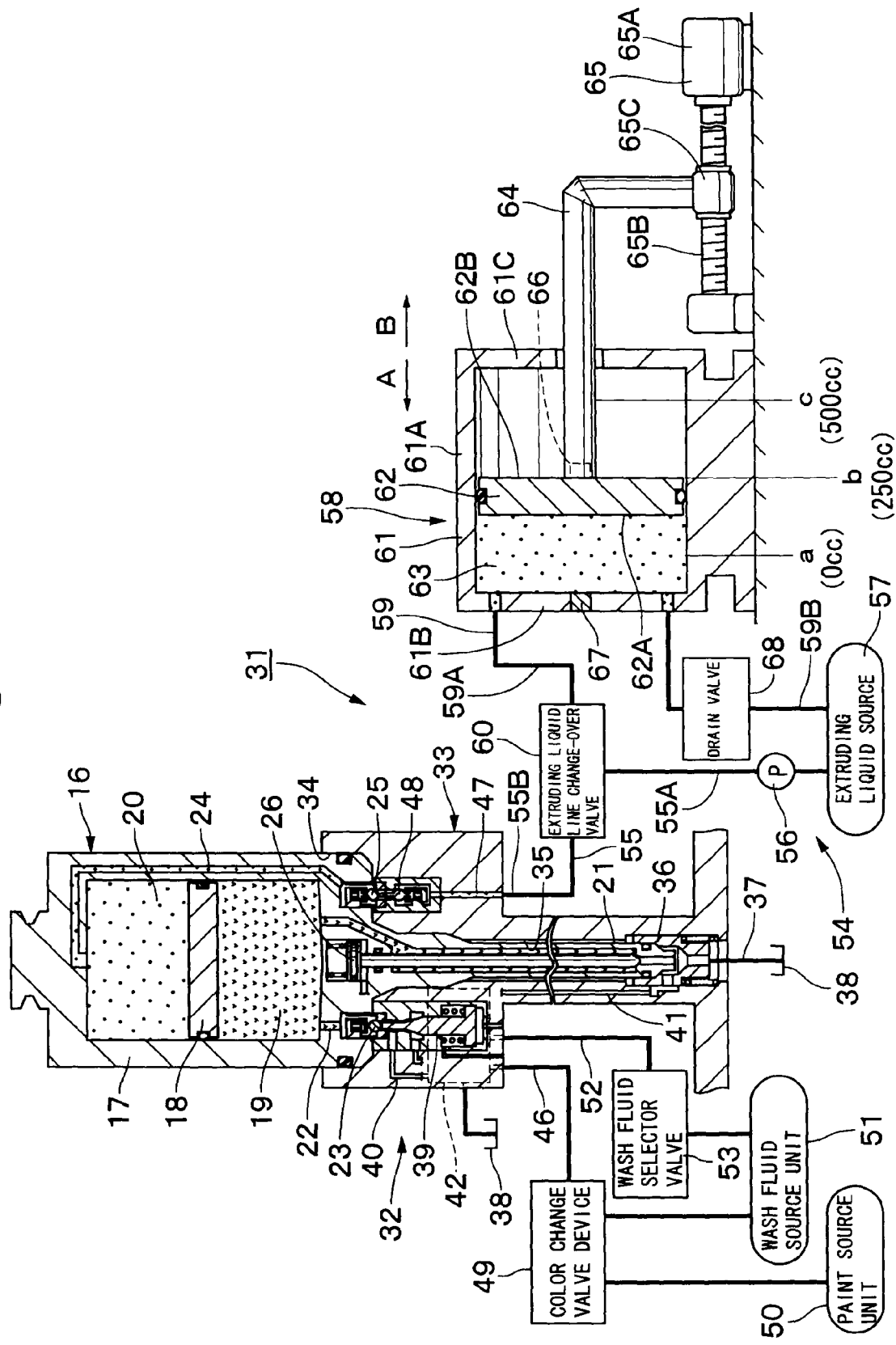
FIG. 11 is a schematic illustration of the paint replenishing system for a cartridge in an operational phase in which paint is refilled into a paint chamber in a cartridge.

Then, as shown in FIG. 11, as soon as the rear face 62B of the piston 62 is shifted to the setting position b, this is detected by the sensor 66 of the quantitation setup mechanism 58, and a replenishment stop signal is fed to the control unit of the paint replenishing device 31. In response to the replenishment stop signal from the sensor 66, the paint feed valve 43 of the paint/wash fluid change-over valve 42 is closed by the control unit to stop the paint supply to the cartridge 16. Further, the switching action of the paint passage change-over valve 39 is cancelled to close the quick joint 23. Besides, the color A paint valve 49A of the color change valve device 49 is closed to suspend the paint replenishment.

In this manner, by metering a quantity of an extruding liquid, which is discharged from the extruding liquid chamber 20 as a quantity of replenishing paint which feeds the paint chamber 19, it is possible to refill accurate amount of 250 cc of paint to the paint chamber 19.

Now, upon completion of the replenishing stage, the operation proceeds to a post-replenishment stage to discharge and wash away paint which remains in various parts.

The post-replenishment stage is started with an operation of washing off paint residues on the side of the paint feed mechanism 32, including the paint line 46, paint feed valve 43, outlet passage 40 and paint passage change-over valve 39. At this time, the wash fluid feed valve 44 of the paint/wash fluid change-over valve 42 is opened, and the wash air valve 53Ar and wash liquid valve 53Lq of the wash fluid selector valve 53 are opened alternately to let the wash air and wash liquid flow through the wash fluid selector valve 53, wash fluid feed valve 44, outlet passage 40, paint passage change-over valve 39, waste liquid passage 41 and connector member 36, discharging spent wash fluids to the waste liquid tank 38 through the waste liquid line 37.

Now, paint residues of color A in the paint line 46 are washed away in the manner as follows. Namely, for this purpose, the waste liquid valve 45 is opened, and the wash liquid valve 49Lq and wash air valve 49Ar of the color change valve device 49 are opened alternately, directly feeding wash fluids from the color change valve device 49 to the paint line 46 to wash away residues of color A and discharging same to the waste liquid tank 38.

In this instance, the wash fluids in circulation through the waste liquid passage 41 as mentioned above can be directed toward a fore end portion of the feed tube 21 from the radial port 36A of the connector member 36 to efficiently wash off scattered paint deposits on the fore end portion of the feed tube 21.

Figure 12:
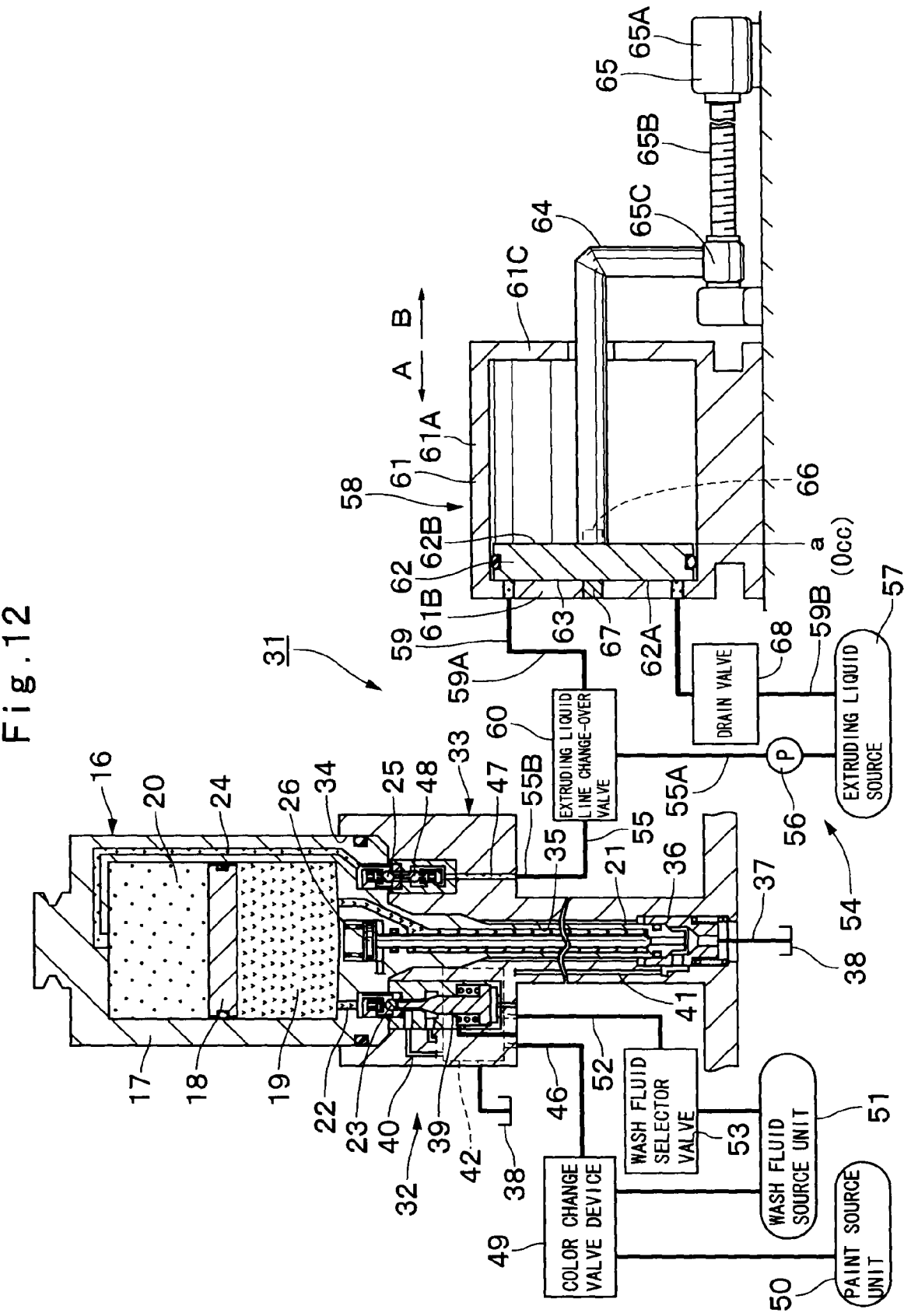
FIG. 12 is a schematic illustration of the paint replenishing system for a cartridge in an operational phase in which an extruding liquid is returned to an extruding liquid source from a metering chamber of the quantitation setup means.

On the other hand, in the post-replenishment stage, the return valve 60B of the extruding liquid line change-over valve 60 of the quantitation setup mechanism 58 is closed while the drain valve 68 is opened. In this state, the servo motor 65A of the quantitation setup portion 65 is put in rotation to move the support arm 64 in the direction of arrow A to push the piston 62 with the support arm 64 in the direction of arrow A. As a result, as shown in FIG. 12, the extruding liquid in the metering chamber 63 can be returned to the extruding liquid source 57 through the drain line 59B.

Further, as the piston 62 is pushed in the direction of arrow A as far as the initial position a in the proximity of or in abutting engagement with the front lid portion 61A of the quantitation tank 61, the front face 62A of the piston 62 is detected by the initial position sensor 67, and an initial position detection signal is output to the control unit of the paint replenishing device 31 to permit a next paint replenishing operation.

In the foregoing description, the cartridge 16 is replenished with paint of a different color. Now, described below with reference to FIG. 14 are procedures for replenishing a cartridge 16 repeatedly with paint of the same color.

In this case, there is no need to proceed the washing stage for a cartridge 16, even if a previous color remains in the cartridge 16. Therefore, as soon as a cartridge 16 is set on a replenishing stool 33 for paint replenishment as shown in FIG. 14, a replenishing operation can be started immediately to refill the cartridge with paint of the same color in a preset quantity.

Thus, according to the present embodiment, the quantity of paint to be replenished into a paint chamber 19 of a cartridge 16 is set up in advance by way of the quantitation setup mechanism 58, which is arranged to meter an amount of an extruding liquid which is displaced and discharged out of the extruding liquid chamber 20 as a result of a paint replenishment into the paint chamber 19 and to stop the paint replenishment by the paint feed mechanism 32 as soon as the amount of the displaced extruding liquid reaches a preset quantitation value.

At the time of a paint replenishment, a cartridge 16 is set on a replenishing stool 33 of the paint feed mechanism 32, whereupon a paint chamber 19 is connected to the respective paint sources 50A through 50N of the paint source unit 50 while an extruding liquid chamber 20 is connected to the quantitation setup mechanism 58. Now, the paint feed mechanism 32 can replenish the paint chamber 19 of the cartridge 16 with paint from a selected one of the paint sources 50A to 50N. In step with a progress of paint replenishment into the paint chamber 19, an equivalent amount of an extruding liquid is displaced and discharged from the extruding liquid chamber 20 at the cartridge 16.

Accordingly, irrespective of paint properties (e.g., viscosity, specific gravity or existence of a metallic component), the quantitation setup mechanism 58 can correctly quantitate replenished paint which are replenished in the cartridge 16 by metering the amount of an extruding liquid which is discharged from the extruding liquid chamber 20 of the cartridge 16. As soon as the discharges of the extruding liquid reach a preset quantitation value, the quantitation setup mechanism 58 stop the paint replenishment by the paint feed mechanism 32. Thus, the cartridge 16 is correctly replenished with a preset amount of paint.

As a result, all paint, which will be used in coating operation can replenish in correct amount to the cartridge 16, irrespective of the nature of paint, it becomes possible to contribute to cut the paint consumption through reductions of wasteful paint rejections and to cut the cost of waste disposal as well. In addition, even in a case where a cartridge 16 is replenished exclusively with paint of a specific color repeatedly, it becomes possible to prevent old paint from accumulating in the cartridge 16 to improve the finish quality of paint coatings.

Further, the quantitation setup mechanism 58 is composed of the quantitation tank 61 which is connectible to an extruding liquid chamber 20 of a cartridge 16, a piston 62 defining the metering chamber 63 on one side thereof and being displaced in step with a progress of quantitation of the extruding liquid introduced into the metering chamber 63, the quantitation setup portion 65 for preset a specified amount of replenishment for the cartridge 16, and the sensor 66 which is adapted to output a replenishment stop signal as soon as the piston 62 is displaced as far as a preset position by the quantitation setup portion 65.

With the quantitation setup mechanism 58, an extruding liquid which is discharged from an extruding liquid chamber 20 of a cartridge 16 is introduced into the metering chamber 63. At this time, commensurate with the amount of the extruding liquid introduced into the metering chamber 63, the piston 62 is accurately put in a displacement. Therefore, the paint replenishment into a paint chamber 19 can be correctly quantitated by way of detecting a distance of displacement of the piston 62 by the sensor 66.

Upon detecting the piston 62 displaced a predetermined distance in the direction of arrow B, a replenishment stop signal is fed to the control unit of the paint replenishing device 31 from the quantitation setup mechanism 58 to stop the paint replenishment by the paint feed mechanism 32. Thus, a preset amount of paint, necessary for a next paint coating operation, can be correctly quantitated by the metering chamber 63 and replenished into a paint chamber 19 of a cartridge 16.

Further, the quantitation setup portion 65, which is arranged to shift the position of the sensor 66 by means of the servo motor 65A, can adjust the position of the piston 62 correctly in a stepless fashion. That is to say, the amount of paint to be replenished into the paint chamber 19 of a cartridge 16 can be set up properly and correctly.

On the other hand, the quantitation setup portion 65 is arranged to push the piston 62 in the direction of arrow A as far as the initial position a (see FIG. 10) where the inner space of the metering chamber 63 is squeezed to a minimum volume. Thus, by pushing back the piston 62 by the support arm 64 in a post-replenishment stage, an extruding liquid in the metering chamber 63 can be returned to the extruding liquid source 57. Since the piston 62 can be moved by the quantitation setup portion 65 for shifting the sensor 66 without resorting to an exclusive piston drive mechanism, the quantitation setup mechanism 58 can be provided in a simplified form in construction.

Further, the initial position sensor 67 is provided on the front lid portion 61B of the quantitation tank 61 to detect the piston 62 as soon as it is located in the initial position a after pushing the inner space of the metering chamber 63 to a minimum volume. Thus, there is no possibility of replenishing a cartridge 16 with an incorrect amount of paint.

Furthermore, since the quantitation setup mechanism 58 is adapted to meter the amount of replenished paint in the paint chamber 19 on the basis of an amount of an extruding liquid which is displaced and discharged out of the extruding liquid chamber 20 of the cartridge 16 in step with a progress of paint replenishment. Therefore, even in the event of a change of a paint supply line, replenishing paint can be quantitated accurately without necessitating any adjustment.

Figure 15:
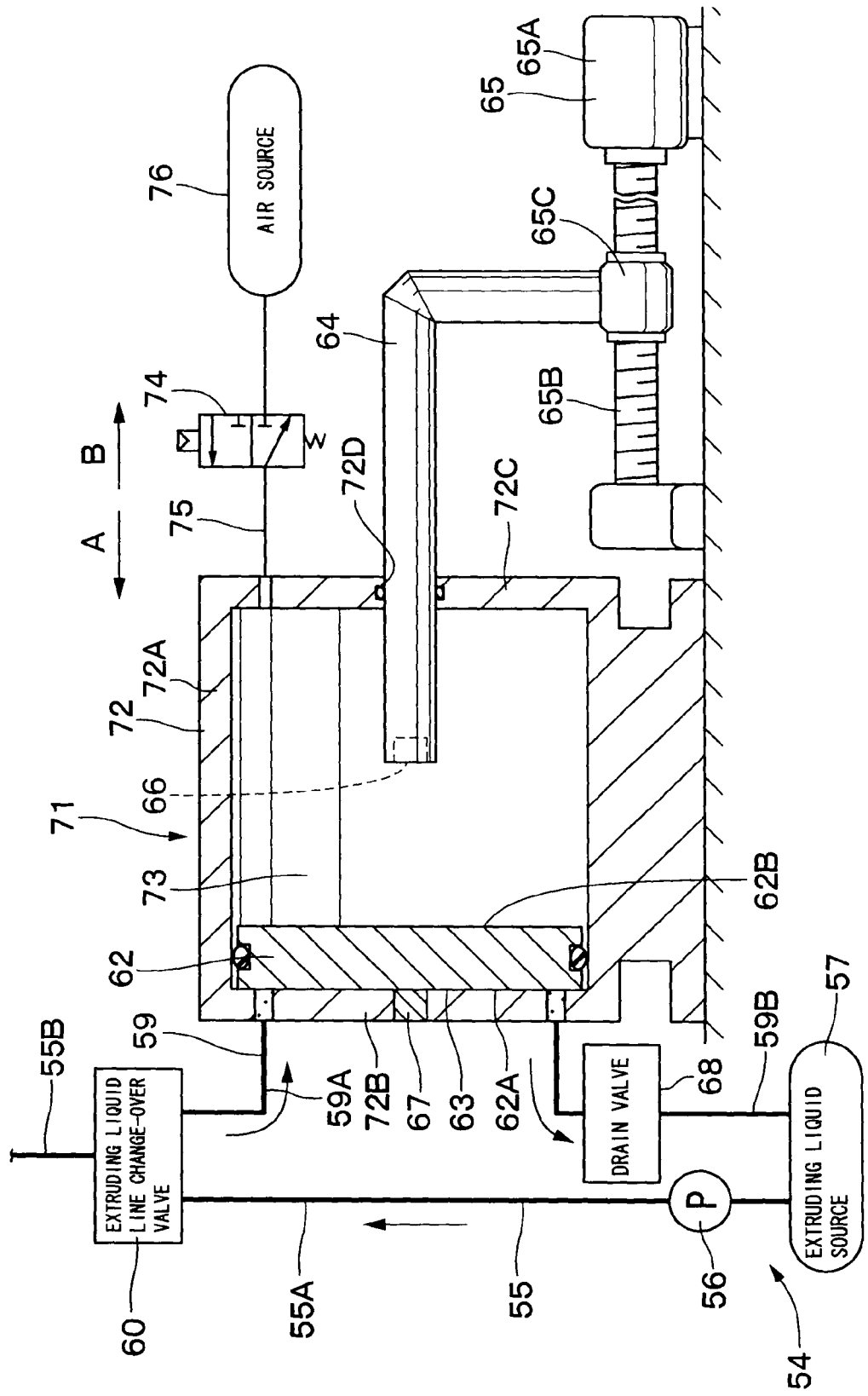
FIG. 15 is a vertical sectional view of a quantitation setup means in a second embodiment of the invention.
Figure 16:
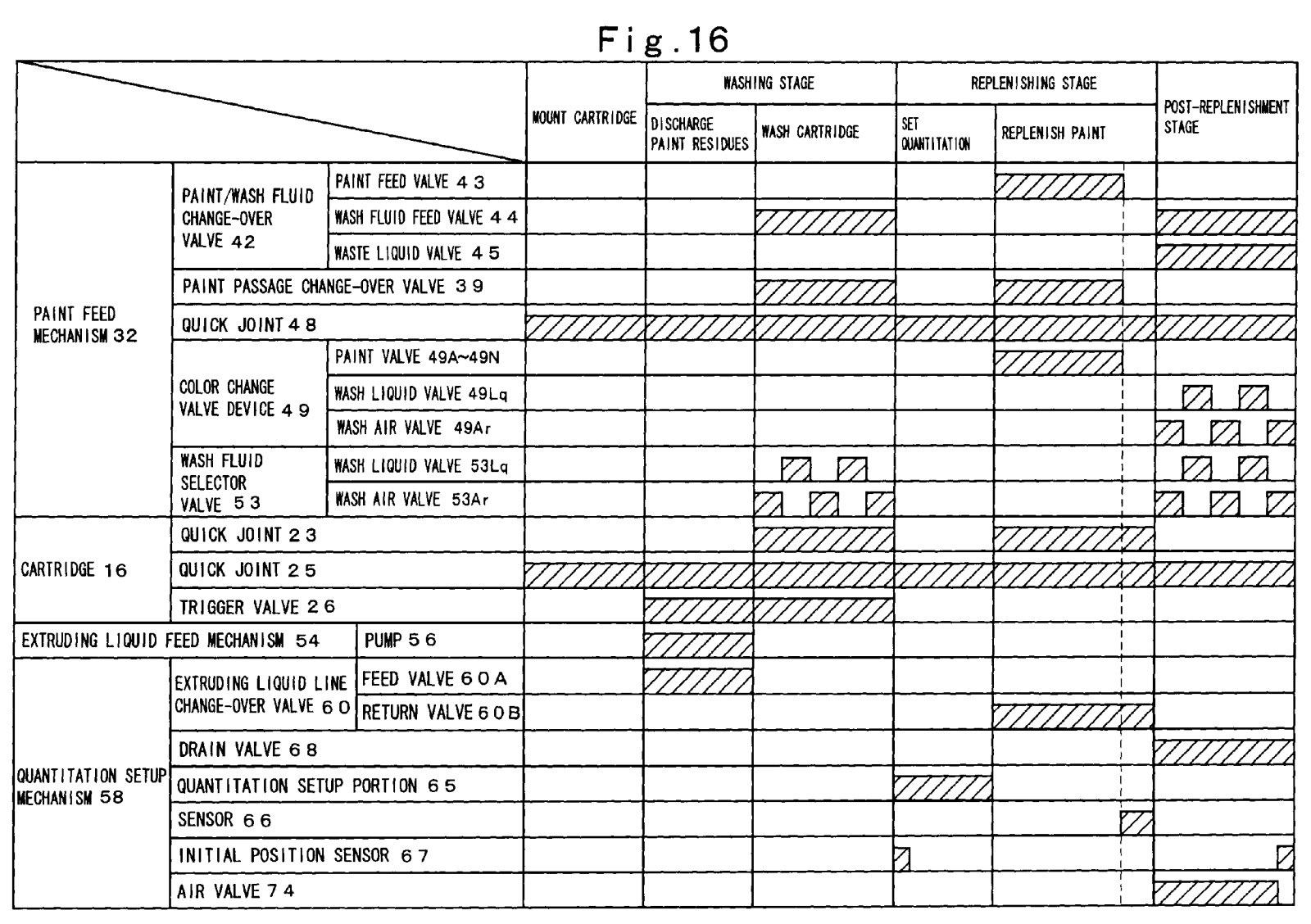

Now, referring to FIGS. 15 and 16, there is shown a second embodiment of the present invention. This embodiment has a feature in that the quantitation mechanism is adapted to move a piston to an initial position by the use of compressed air. In the following description of the second embodiment, those component parts which are equivalent with a counterpart in the foregoing first embodiment are simply designated by the same reference numeral or character to avoid repetitions of similar explanations.

In FIG. 15, indicated at 71 is a quantitation setup mechanism which is adopted as a quantitation setting means in the second embodiment, and at 72 a quantitation tank of the quantitation setup mechanism 71. Similarly to the quantitation tank 61 in the first embodiment, the quantitation tank 72 is constituted of a tubular body 72A, a front lid portion 72B and a rear lid portion 72C. An arm passage hole 72D is formed in the rear lid portion 72C for insertion of a support arm 64. Similarly to the first embodiment, a piston 62 is fitted in the quantitation tank 72, defining a metering chamber 63 between the piston 62 and the front lid portion 72B.

However, the quantitation tank 72 of the second embodiment differs from the quantitation tank 61 in the first embodiment in that the arm passage hole 72D is fitted air-tight around the circumference of the support arm 64, and in that an air valve 74 is connected as described hereinafter. In the case of the second embodiment, an air chamber 73 is defined in the quantitation tank 72, on the rear face 62B of the piston 62.

Indicated at 74 is an air valve which is connected to the air chamber 73 of the quantitation tank 72 through an air line 75. This air valve 74 plays a role of selectively connecting the air chamber 73 with the atmosphere or an air source 76. Namely, the air valve 74 is adapted to normally communicate the air chamber 73 with the atmosphere to release compressed air, permitting the piston 62 to move in the direction of arrow B. On the other hand, when the air valve 74 is switched to connect the air line 75 with the air source 76, compressed air is fed, pushing the piston 62 in the direction of arrow A toward an initial position as indicated in a time chart of FIG. 16, irrespective of operations of a sensor 66 and support arm 64.

Being arranged in the manner as described above, the second embodiment can produce substantially the same operational effects as the foregoing first embodiment. Especially in the case of the second embodiment, the piston 62 is moved by means of the air valve 74 as shown in FIG. 16. Therefore, no matter in which position the support arm 64 is located, the piston 62 can be moved in the direction of arrow A toward the initial position a simply by introducing compressed air into the air chamber 73 by switching the air valve 74. Accordingly, in this case, there is no need for driving the support arm 64 at the time of returning the piston 62 to the initial position a, permitting to carry out replenishing process in a more efficient manner.

In the foregoing embodiments, the paint/wash fluid change-over valve 42 is provided on the replenishing stool 33 of the paint feed mechanism 32, providing two separate wash lines for the purpose of shortening the time period of a washing operation, i.e., a line for washing the outlet passage 40 and paint chamber 19 of a cartridge 16 and a line for washing from the color change valve device 49 to the paint line 46.

Figure 17:
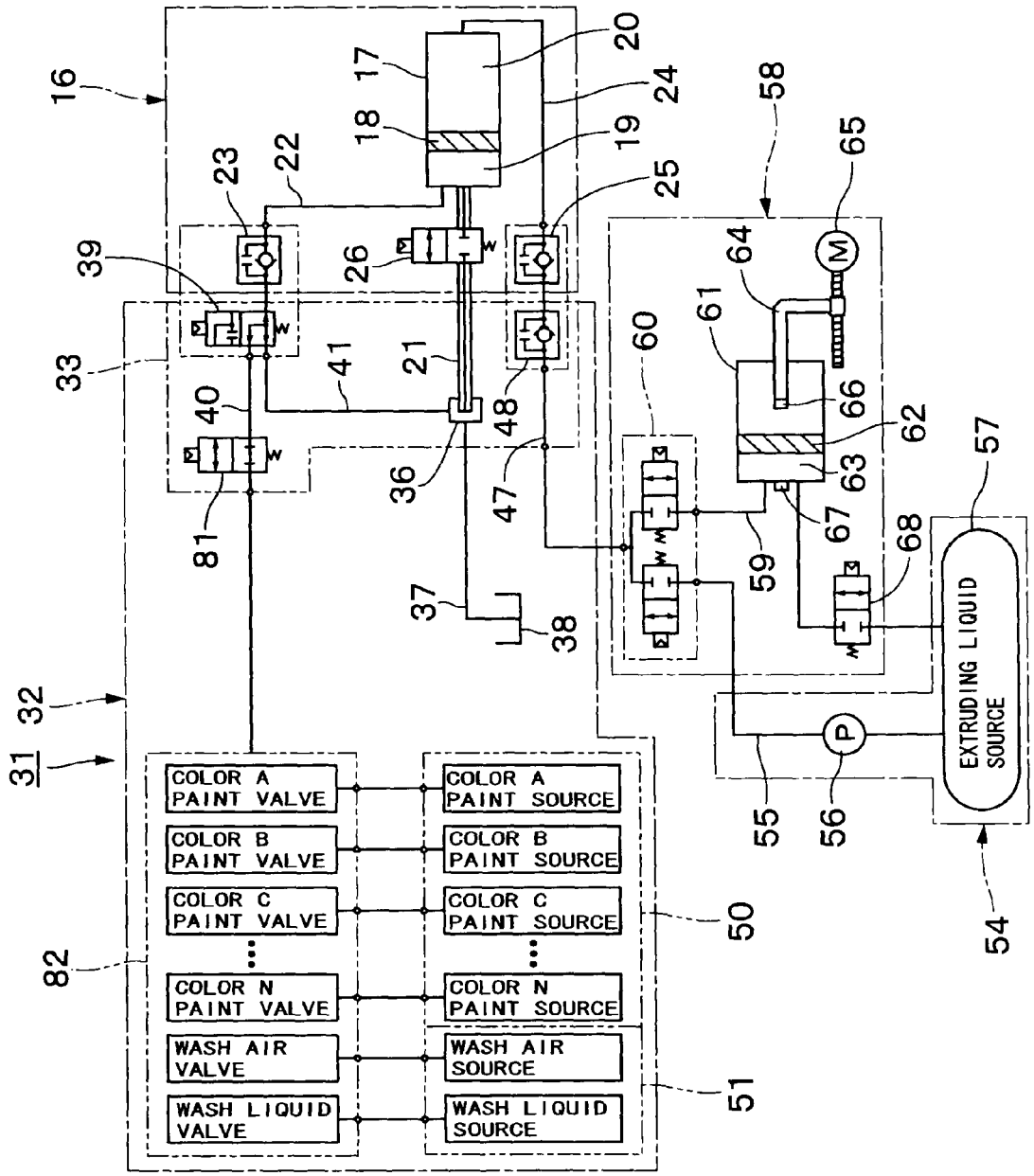
FIG. 17 is a circuit diagram of a paint replenishing system for a cartridge in a modification according to the invention.

However, in this regard, it is to be understood that the present invention is not limited to the particular example shown. For instance, as in a modification shown in FIG. 17, a paint feed valve 81 which is directly connected to a color change valve device 82 may be provided on a replenishing stool 33. In this case an outlet passage 40 and a paint chamber 19 of a cartridge 16 can be washed with wash liquid and wash air which are supplied from the color change valve device 82. That is to say, in this case, the wash fluid feed valve 44 and the waste liquid valve 45 of the paint/wash fluid change-over valve 42 as well as bypass lines 52Lq, 52Ar and a wash fluid selector valve 53 can be omitted.

Further, in the foregoing embodiments, by way of example arrangements are made such that the paint feed valve 43 of the paint/wash fluid change-over valve 42 is closed in response to a replenishment stop signal which is fed to a control unit (not shown) from the sensor 66 of the quantitation setup mechanism 58. However, in this regard, the present invention is not limited to the particular arrangements shown. For instance, the paint feed mechanism may be arranged in such a way as to stop a replenishing operation as soon as a replenishment stop signal is applied to a corresponding one of paint valves 49A through 49N of the color change valve device 49 from a control unit. Alternatively, a replenishing operation may be stopped by simultaneously closing both of the paint feed valve 43 and color A feed valve 49A by the replenishment stop signal.

Further, in the foregoing embodiments, by way of example a piston 18 is provided in a tank 17 of a cartridge 16 as a movable partition wall to be put in a sliding displacement within the tank 17. However, the present invention is not limited to this particular example. For instance, a bellows structure or a flexible bag may be provided in a tank 17 of a cartridge 16 as a movable partition wall which is internally communicated with a feed tube.

On the other hand, in the foregoing embodiments, by way of example the support arm 64, quantitation setup portion 65 and sensor 66 are provided separately from the quantitation tank 61. However, in this regard, the present invention is not limited to the particular example shown. For instance, the support arm 64 may be formed integrally with the shift member 65C of the quantitation setup portion 65. Alternatively, the support arm, sensor and quantitation setup portion may be integrally incorporated into one quantitation tank assembly. Further, a bellows or a diaphragm may be employed as a movable partition wall in place of the piston 62 if desired.

Furthermore, in the foregoing embodiments, by way of example arrangements are made such that paint is replenished into a paint chamber 19 of a cartridge 16 through the quick joint 23 and paint passage 22. However, the present invention is not limited to the particular arrangements shown. For instance, in a manner similar to Japanese Patent Laid-Open No. 2000-176328, a color change valve device and a replenishing valve may be provided at the position of a waste liquid line 37 which is connected to a replenishing stool 33 to replenish paint into a paint chamber 19 of a cartridge 16, for example, by way of a paint supply passage 21A of a feed tube 21 and a paint passage 17B of a tank 17. In this case, the paint passage 22 on the side of a cartridge, quick joint 23 and paint passage change-over valve 39 can be omitted.

Moreover, in the foregoing embodiments, by way of example an extruding liquid is fed toward a cartridge 16 from the extruding liquid source 57 by the use of the pump 56. However, the present invention is not limited to this particular example. In a case where an extruding liquid is fed under a high pressure like a circulation line in a plant, the pump 56 can also be omitted.

The invention claimed is:

1. A paint replenishing system for a cartridge composed of:
    a paint feed means (32) for feeding paint to a cartridge (16) which is defined to a paint chamber (19) and an extruding liquid chamber (20) by a partition wall (18), and
    an extruding liquid feed means (54) adapted to push out residual paint from said paint chamber (19) by feeding an extruding liquid to said extruding liquid chamber (20) of said cartridge (16), characterized in that said paint replenishing system for a cartridge comprises:
    a quantitation setup means (58, 71) for presetting a quantity of paint to be replenished into said paint chamber (19) of said cartridge (16) according to a preset target quantitation value, and stopping paint replenishment by said paint feed means (32) as soon as discharges of an extruding liquid from said extruding liquid chamber (20) reaches a preset target quantitation value by a replenished paint of said paint chamber (19) by said paint feed means (32); and
    said quantitation setup means (58, 71) comprised of a quantitation tank (61, 72), an extruding liquid line change-over valve (60) for selectively connecting said extruding liquid chamber (20) of said cartridge (16) with either an extruding liquid feed means (54) or said quantitation tank (61, 72), a movable partition wall (62) incorporated into said quantitation tank (61, 72) to define therein a metering chamber (63) having an inner volume varying in proportion to a quantity of said extruding liquid introduced into said metering chamber (63) from said extruding liquid chamber (20) of said cartridge (16), a quantitation setup portion (65) for presetting a quantity of paint replenishment to said extruding liquid chamber (20) of said cartridge (16), and a sensor (66) adapted to output a replenishment stop signal as soon as said movable partition wall (62) is displaced to a predetermined position preset by said quantitation setup portion (65).

2. A paint replenishing system for a cartridge as defined in claim 1, wherein said paint feed means (32) is adapted to stop a quantitative paint replenishment in response to a replenishment stop signal output by said sensor (66).

3. A paint replenishing system for a cartridge as defined in claim 1, wherein said quantitation setup portion (65) is adapted to squeeze residues of said extruding liquid out of said metering chamber (63) by pushing said movable partition wall (62) as far as an initial position, reducing inner space of said metering chamber (63) to a minimum volume.

4. A paint replenishing system for a cartridge as defined in claim 1, wherein a metering chamber (63) and an air chamber (73) are defined in said quantitation tank (72) by said movable partition wall (62), said air chamber (73) of said quantitation tank (72) being connected to an air valve (74) thereby to push said partition wall (62) as far as an initial position, reducing inner space of said metering chamber (63) to a minimum volume.

5. A paint replenishing system for a cartridge as defined in claim 1, wherein an initial position sensor (67) is provided in said quantitation tank (61, 72) to detect location of said movable partition wall (62) at an initial position after pushing inner space of said metering chamber (63) to a minimum volume.

6. A paint replenishing system for a cartridge as defined in claim 1, wherein said paint feed means (32) is comprised of a replenishing stool (33) for mounting a cartridge (16), a color change valve device (49, 82) connected to said replenishing stool (33) to supply paint and wash fluids to said cartridge (16), and a paint feed valve (43, 81) connected between said replenishing stool (33) and said color change valve device (49, 82) to turn on and off a paint supply from said color change valve device (49, 82);
    said quantitation setup means (58, 71) being adapted to output a replenishment stop signal as soon as discharges of an extruding liquid from said extruding liquid chamber (20) of said cartridge (16) reach a preset quantitation value; and
    said paint feed means (32) being adapted to end a quantitative paint replenishment by stopping a paint supply from said paint feed valve (43, 81) and/or said color change valve device (49, 82) to complete a quantitative replenishment as soon as a replenishment stop signal is output by said quantitation setup means (58, 71).

7. A paint replenishing system for a cartridge as defined in claim 1, wherein said paint feed means (32) is comprised of a replenishing stool (33) for mounting said cartridge (16), a color change valve device (49, 82) connected to said replenishing stool (33) to supply paint and wash fluids to said cartridge (16), and a paint feed valve (43, 81) connected between said replenishing stool (33) and said color change valve device (49, 82) to turn on and off a paint supply from said color change valve device (49, 82);
    said extruding liquid feed means (54) being comprised of an extruding liquid source (57) holding a stock of extruding liquid, an extruding liquid line (55) connected between said extruding liquid source (57) and said replenishing stool (33), and a pump (56) provided in said extruding liquid line (55);
    said quantitation setup means (58, 71) having said extruding liquid line change-over valve (60) provided in said extruding liquid line (55) at a position between said replenishing stool (33) and said pump (56); and
    said extruding liquid line change-over valve (60) being comprised of a feed valve (60A) for establishing and blocking communication between said extruding liquid chamber (20) of said cartridge (16) and said pump (56), and a return valve (60B) for establishing and blocking communication between said extruding liquid chamber (20) of said cartridge (16) and said metering chamber (63) of said quantitation tank (61, 72).

8. A paint replenishing system for a cartridge as defined in claim 7, wherein said paint feed means (32) is adapted to end a quantitative paint replenishment by stopping a paint supply from said paint feed valve (43, 81) and/or said color change valve device (49, 82) in response to a replenishment stop signal output by said sensor (66) of said quantitation setup means (58, 71).

9. A paint replenishing system for a cartridge as defined in claim 7, wherein said quantitation setup means (58, 71) further comprises a drain valve (68) which being closed when an extruding liquid is introduced into said metering chamber (63) of said quantitation tank (61, 72) and opened when draining said extruding liquid from said metering chamber (63).

* * * * *